(12) United States Patent
Jones et al.

(10) Patent No.: US 10,585,292 B2
(45) Date of Patent: Mar. 10, 2020

(54) LOW-PROFILE COLOR-MIXING LIGHTPIPE

(71) Applicant: Fraen Coprporation, Reading, MA (US)

(72) Inventors: Carlton S. Jones, Boxford, MA (US); Robert A. Gobron, Southborough, MA (US); Anthony L. Bolzan, Boxford, MA (US)

(73) Assignee: Fraen Corporation, Reading, MA (US)

( * ) Notice: Subject to any disclaimer, the term of this patent is extended or adjusted under 35 U.S.C. 154(b) by 0 days.

(21) Appl. No.: 16/021,942

(22) Filed: Jun. 28, 2018

(65) Prior Publication Data

US 2020/0004033 A1     Jan. 2, 2020

(51) Int. Cl.
*G02B 27/09* (2006.01)
*G02B 6/122* (2006.01)
*G02B 15/14* (2006.01)

(52) U.S. Cl.
CPC ......... *G02B 27/0994* (2013.01); *G02B 6/122* (2013.01); *G02B 15/142* (2019.08); *G02B 27/0955* (2013.01)

(58) Field of Classification Search
CPC ............ G02B 27/0994; G02B 27/0955; G02B 15/161; G02B 6/122; G02B 6/0005; G02B 6/0011; G02B 6/02; G02B 6/08
See application file for complete search history.

(56) References Cited

U.S. PATENT DOCUMENTS

| | | | |
|---|---|---|---|
| 3,784,277 A | 1/1974 | Baker | |
| 5,271,077 A | 12/1993 | Brockman et al. | |
| 5,550,716 A | * 8/1996 | Dassanayake | B60Q 1/0011 362/560 |
| 6,056,426 A | * 5/2000 | Jenkins | B60O 1/0011 362/558 |
| 6,200,002 B1 | 3/2001 | Marshall et al. | |

(Continued)

FOREIGN PATENT DOCUMENTS

| | | |
|---|---|---|
| CN | 1624578 A | 6/2005 |
| CN | 1979251 A | 6/2007 |

(Continued)

OTHER PUBLICATIONS

U.S. Appl. No. 15/185,627, filed Jun. 17, 2016, Marco Angelini et al.

(Continued)

*Primary Examiner* — Joseph L Williams
*Assistant Examiner* — Jose M Diaz
(74) *Attorney, Agent, or Firm* — Nelson Mullins Riley & Scarborough LLP; Thomas J. Engellenner; Reza Mollaaghababa

(57) ABSTRACT

In one aspect, a light-mixing system is disclosed, which includes a light pipe having an input surface configured for receiving light from a light source, a light-mixing segment optically coupled to the input surface, and an output surface optically coupled to said light-mixing segment through which light exits the light pipe. A putative vector normal to at least one of the input or the output surface forms a non-zero angle relative to a longitudinal axis of the light-mixing segment. In some embodiments, the non-zero angle can be, for example, about 90 degrees.

71 Claims, 30 Drawing Sheets

(56) References Cited

U.S. PATENT DOCUMENTS

| | | | |
|---|---|---|---|
| 6,219,480 B1* | 4/2001 | Cassarly | G02B 6/2804 385/31 |
| 6,341,876 B1 | 1/2002 | Moss et al. | |
| 6,547,416 B2 | 4/2003 | Pashley et al. | |
| 6,575,580 B2 | 6/2003 | Okamori et al. | |
| 6,614,972 B1* | 9/2003 | Lundin | G02B 6/0005 385/115 |
| 6,819,505 B1 | 11/2004 | Cassarly et al. | |
| 6,995,355 B2 | 2/2006 | Rains, Jr. et al. | |
| 7,145,125 B2 | 12/2006 | May et al. | |
| 7,349,163 B2 | 3/2008 | Angelini et al. | |
| 7,581,862 B2 | 9/2009 | Stefanov et al. | |
| 7,907,345 B2 | 3/2011 | Paulussen et al. | |
| 8,246,210 B2 | 8/2012 | Angelini et al. | |
| 8,482,226 B2 | 7/2013 | Vinther et al. | |
| 9,243,760 B2* | 1/2016 | Nina Lillelund | G02B 6/0008 |
| 9,411,083 B2 | 8/2016 | Angelini et al. | |
| 9,772,499 B2 | 9/2017 | Angelini et al. | |
| 9,995,872 B2 | 6/2018 | Angelini et al. | |
| 10,151,872 B2 | 12/2018 | Angelini et al. | |
| 10,254,474 B2 | 4/2019 | Angelini et al. | |
| 2002/0135869 A1 | 9/2002 | Banish et al. | |
| 2005/0036203 A1 | 2/2005 | Ferri et al. | |
| 2005/0168987 A1 | 8/2005 | Tamaoki et al. | |
| 2005/0286123 A1 | 12/2005 | Abu-Ageel | |
| 2006/0018031 A1 | 1/2006 | Takasugi | |
| 2006/0039160 A1 | 2/2006 | Cassarly et al. | |
| 2006/0044523 A1 | 3/2006 | Teijido | |
| 2006/0153518 A1 | 7/2006 | Abu-Ageel | |
| 2006/0291206 A1 | 12/2006 | Angelini et al. | |
| 2007/0024971 A1 | 2/2007 | Cassarly et al. | |
| 2007/0126994 A1 | 6/2007 | Hwang | |
| 2008/0030974 A1 | 2/2008 | Abu-Ageel | |
| 2008/0068852 A1 | 3/2008 | Goihl | |
| 2008/0239717 A1 | 10/2008 | Chen et al. | |
| 2009/0034278 A1 | 2/2009 | Tessnow et al. | |
| 2009/0109698 A1* | 4/2009 | Koyata | G02B 6/0008 362/553 |
| 2009/0185392 A1 | 7/2009 | Krupa | |
| 2010/0188018 A1 | 7/2010 | Salm | |
| 2010/0226127 A1 | 9/2010 | Bigliatti et al. | |
| 2011/0109445 A1 | 5/2011 | Weaver et al. | |
| 2011/0267823 A1 | 11/2011 | Angelini et al. | |
| 2012/0127710 A1 | 5/2012 | Jurik et al. | |
| 2013/0039090 A1* | 2/2013 | Dau | F21S 8/04 362/551 |
| 2013/0155723 A1* | 6/2013 | Coleman | G02B 6/0018 362/621 |
| 2013/0258699 A1* | 10/2013 | Weaver | F21V 17/04 362/555 |
| 2013/0294045 A1 | 11/2013 | Morgenbrod | |
| 2013/0301291 A1* | 11/2013 | Lavizzari | F21V 7/0033 362/555 |
| 2014/0340927 A1* | 11/2014 | Johnston | G02B 6/0046 362/555 |
| 2016/0370529 A1 | 12/2016 | Angelini et al. | |
| 2017/0142314 A1 | 5/2017 | Moore | |
| 2017/0299955 A1 | 10/2017 | Kawamura et al. | |
| 2017/0351101 A1 | 12/2017 | Angelini et al. | |
| 2019/0033511 A1 | 1/2019 | Gobron et al. | |
| 2019/0146148 A1 | 5/2019 | Angelini et al. | |
| 2019/0278018 A1 | 9/2019 | Angelini et al. | |

FOREIGN PATENT DOCUMENTS

| | | |
|---|---|---|
| EP | 1398659 A2 | 3/2004 |
| EP | 2211089 A1 | 7/2010 |
| EP | 2211090 A1 | 7/2010 |
| JP | 2004184612 A | 7/2004 |
| JP | 2007012530 A | 1/2007 |
| WO | 20040332250 A1 | 4/2004 |
| WO | 2010091097 A1 | 8/2010 |
| WO | 2010113100 A1 | 10/2010 |
| WO | 2013098387 A2 | 7/2013 |
| WO | 2013149139 A1 | 10/2013 |

OTHER PUBLICATIONS

U.S. Appl. No. 15/976,314, filed May 10, 2018, Marco Angelini et al.

U.S. Appl. No. 16/156,620, filed Oct. 10, 2018, Marco Angelini et al.

U.S. Appl. No. 16/246,127, filed Jan. 11, 2019, Marco Angelini et al.

U.S. Appl. No. 16/425,158, filed May 29, 2019, Marco Angelini et al.

U.S. Appl. No. 13/729,459, filed Dec. 28, 2012, Marco Angelini et al.

U.S. Appl. No. 15/200,843, filed Jul. 1, 2016, Marco Angelini et al.
U.S. Appl. No. 16/035,339, filed Jul. 13, 2018, Robert A. Gobron.
Anonymous: "TechSpec(™) Light Pipes Homogenize Non-Uniform Light Sources", Jul. 10, 2007 (Jul. 10, 2007), XP055263462, Retrieved from the Internet: URL:http://news.thomasnet.com/fullstory/light-pipes-homogenize-nonuniform-light-sources-523659 ,[retrieved on Apr. 6, 2016], 4 pages.
Application Brief 1-003. Light Guide Technologies; Using LED Lamps. Avago Technologies. Dec. 11, 2006: 22 pages.
European Examination Report dated Apr. 8, 2019 from EP Application No. 167502772, 4 pages.
European Examination Report in corresponding European Application, EP12816673.3 dated Apr. 15, 2016, 7 pages.
European Search Report and Search Opinion dated Feb. 14, 2018 from corresponding European Application No. EP17198505.4, 5 pages.
European Search Report and Search Opinion dated Feb. 19, 2018 from corresponding European Application No. EP17198516.1, 9 pages.
European Search Report and Search Opinion dated Sep. 18, 2019 from corresponding European Application No. EP19192567.6, 10 pages.
Extended European Search Report and European Search Opinion dated May 3, 2019 from corresponding EP Application No. 19157504.2, 8 pages.
Extended European Search Report and European Search Opinion dated Nov. 22, 2018 from corresponding EP Application No. 18194921.5, 9 pages.
International Preliminary Report on Patentability from PCT/US2016/038070 dated Dec. 19, 2017; 12 pages.
International Search Report and Written Opnion for from PCT Application PCT/EP2012/077043 dated Aug. 9, 2013 25 pages.
International Search Report and Written Opnion from PCT/US2016/038070 dated Nov. 16, 2016; 17 pages.
International Search Report/Written Opinion for PCT/US2018/042058 dated Dec. 10, 2018, 12 pages.
Invitation to Pay Additional Fees for PCT Application No. PCT/US2016/038070, dated Sep. 20, 2016; 7 pages.
Japanese Office Action for corresponding Japanese Application No. 2014-549484 dated Oct. 13, 2015, pp. 3.
Japanese Office with English Translation for corresponding Japanese Application 2014-549484 dated May 12, 2015, 5 pages.
Office Action received in Chinese Application No. 201280064730.7, dated Dec. 2, 2016; 16 pages.
PCT International Preliminary Report on Patentability and Written Opinion for PCT/EP2012/077043 dated Jul. 1, 2014 18 pages.
Renaissance Lighting Introduces evo(™) Solid State Product Line With Ed Series, Industry's First LED Downlight, http://www.ledsmagazine.com/ugc/2006/05/renaissance-unvells-evo-solid-State-product-line.hlml, (May 9, 2006), pp. 3.
TechSpec(™) Light Pipes Homogenize Non-Uniform Light Sources. Marketing Edmund Optics, Inc. Press Release date: Jun. 28, 2007: 1 page.
Third Party Observation submitted in corresponding European Application, EP12816673.3, dated Oct. 27, 2017, 6 pages.

(56) References Cited

OTHER PUBLICATIONS

Third Party Observation submitted in corresponding European Application, EP12816673.3, dated Jan. 27, 2016, 5 pages.
Extended European Search Report and European Search Opinion dated Nov. 22, 2019 from corresponding EP Application No. 19182884.7, 10 pages.

* cited by examiner

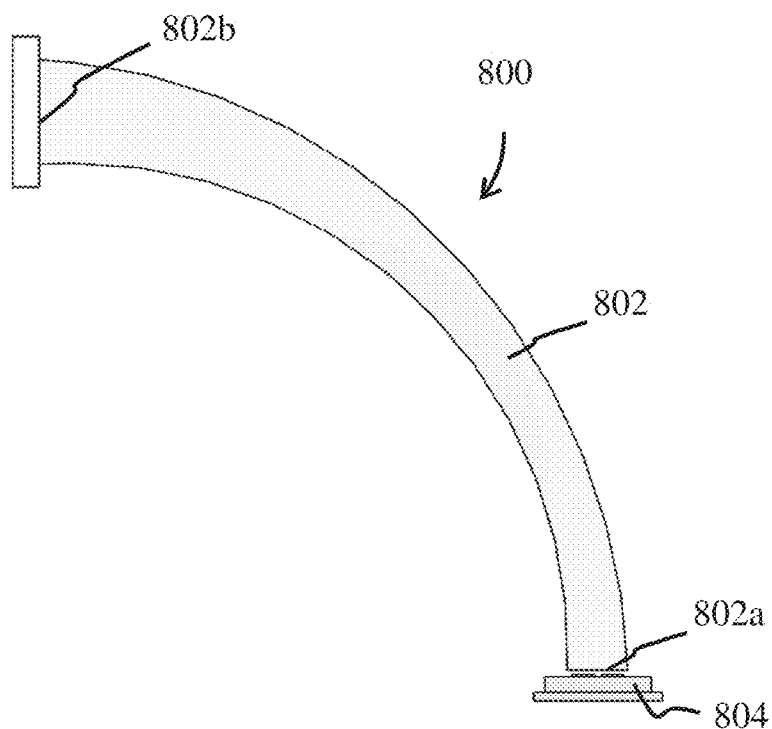
FIG. 8A
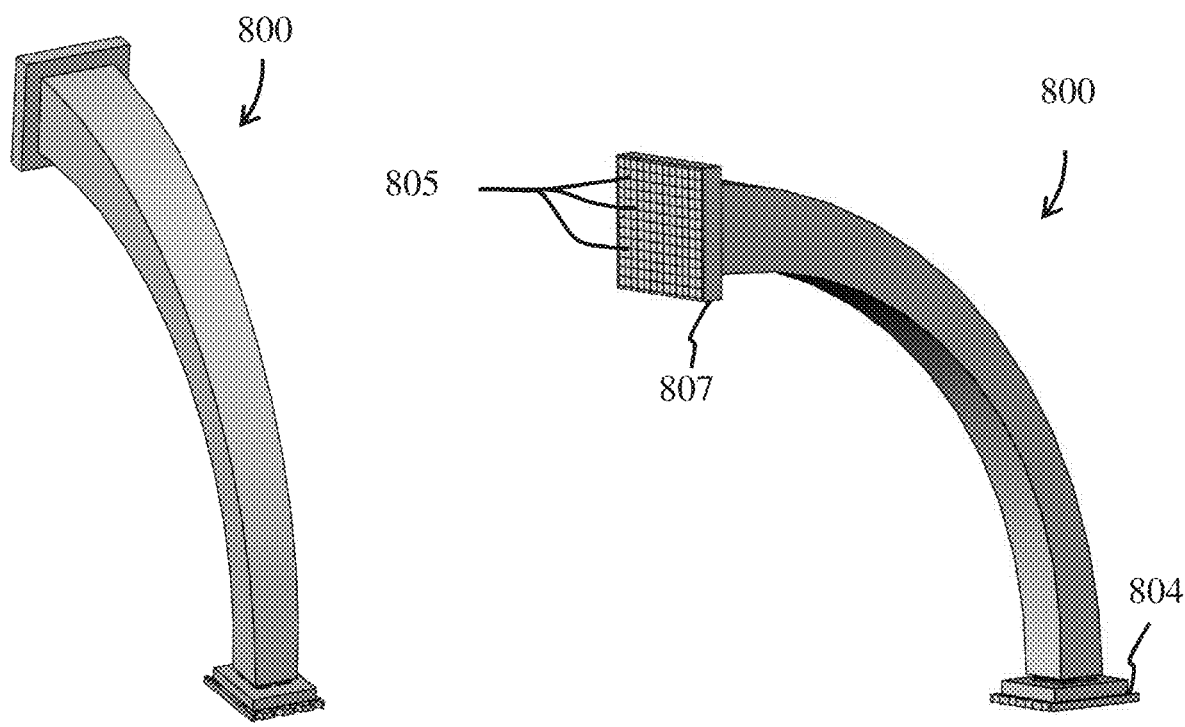
FIG. 8B
FIG. 8C

LOW-PROFILE COLOR-MIXING LIGHTPIPE

BACKGROUND

The present invention is generally directed to light-mixing systems for mixing light from one or more light sources.

A variety of light-mixing optical systems are available for mixing light from one or more light sources, e.g., solid-state light emitting diodes (LEDs). Some conventional light-mixing systems include one-piece collimators as well as two-piece systems, which can consist of a color-mixing rod and a secondary lens that is capable of generating variable beam angles. As the length of the rod increases, so does the effectiveness of the light mixing (color mixing) provided by the rod. However, in conventional systems, an increase in the length of the mixing rod results in a concomitant increase in the height of the system. Many applications, however, require not only excellent light mixing but also a shorter system height than that provided by conventional systems.

Accordingly, there is a need for improved light-mixing systems.

SUMMARY

In one aspect, a light-mixing system is disclosed, which includes a light pipe having an input surface configured for receiving light from a light source, a light-mixing segment optically coupled to the input surface, and an output surface optically coupled to said light-mixing segment through which light exits the light pipe. A putative vector normal to at least one of the input or the output surface forms a non-zero angle relative to a longitudinal axis of the light-mixing segment. In some embodiments, the non-zero angle can be, for example, about 90 degrees.

In some embodiments, the light-mixing system can further include a reflective surface that is optically coupled to the input surface and the light-mixing segment of the light pipe for directing at least a portion of the light received via the input surface to the light-mixing segment. In some embodiments, the reflective surface is metalized to cause the reflection of the light incident thereon. In other embodiments, the reflective surface can reflect the light incident thereon via total internal reflection.

In some embodiments, the light-mixing segment has a polygonal cross sectional profile. By way of example, the light-mixing segment can have a square, a rectangular, a hexagonal, or an octagonal profile.

In some embodiments, the output surface of the light pipe can include a plurality of microlenses, surface texturing or both. By way of example, the surface texturing can be characterized by a plurality of surface projections having a height in a range of about 0.01 mm to about 1 mm. The microlenses can have spherical or aspherical shapes.

In some of the above embodiments, a ratio of a vertical separation (D) between the input and output surfaces of the light pipe relative to a lateral separation (L) therebetween can be, for example, in a range 0 to about 1.

In a related aspect, a light-mixing system is disclosed, which includes a light pipe comprising an input surface for receiving light from a light source, a light-mixing segment optically coupled to the input surface, and an output surface that is optically coupled to the light-mixing segment and through which light can exit the light pipe. At least one of the input and output surfaces is positioned relative to the light-mixing segment such that a resultant propagation direction of light entering the light pipe via the input surface or exiting the light pipe via the output surface forms a non-zero angle relative to a resultant propagation direction of light passing through at least a portion of the light-mixing segment.

In another aspect, a light-pipe is disclosed, which includes a curved light-guiding waveguide extending from a proximal end to a distal end. The curved light-guiding waveguide can include an input surface at the proximal end configured to receive light from a light source and an output surface at the distal end through which light exits the waveguide. In some such embodiments, a projection lens can be optically coupled to the output surface of the light pipe. Further, in some embodiments, the light source can be positioned relative to the input surface of the light pipe such that the light entering the input surface propagates along a direction opposite to the direction of the light exiting the output surface.

In some embodiments of the above light-pipe, a putative vector normal to the input surface of the light pipe is substantially parallel to a putative vector normal to its output surface.

In some embodiments, the curved light-guiding waveguide has a serpentine shape. In some embodiments, the curved light-guiding waveguide has a hemispherical shape.

In some embodiments, the output surface of the light pipe can include a plurality of microlenses and/or surface texturing, such as those discussed herein, for diffusing and/or redirecting the light passing through the output surface.

In some embodiments, a light mixing system according to the present teachings can include a heat sink that is thermally coupled to a light source of the light mixing system for removing heat therefrom. By way of example, the heat sink can include a plurality of fins for facilitating the removal of heat from the light source.

In some embodiments, a light mixing system according to the present teachings can include a light pipe that extends from an input surface to an output surface, where the input and output surfaces are oriented at a 90-degree angle relative to one another. In some such embodiments, the output surface can include a plurality of microlenses and/or surface texturing.

In some embodiments, a light mixing system according to the present teachings can include a light pipe that extends from an input surface to an output surface, where the input and the output surfaces are oriented at 45 degrees relative to one another. In some such embodiments, the output surface can include a plurality of microlenses and/or surface texturing.

In some embodiments, a light pipe of a light-mixing system according to the present teachings can exhibit a tapered cross section extending from its input surface to its output surface, e.g., the tapered cross-section can result in an increase in the cross-sectional area of the light pipe as the light pipe extends from its input surface to its output surface.

In some embodiments, a light pipe of a light-mixing system according to the present teachings can have a light pipe exhibiting different cross-sectional shapes along its length. For example, the cross sections of different sections of the light pipe can have different polygonal shapes. Alternatively, in some embodiments, a portion of the light pipe, e.g., a portion proximate to the input surface, can have a polygonal shape and another portion of the light pipe, e.g., a portion proximate to the output surface, can have a round shape.

In the above embodiments, the light pipe and/or the projection lens can be made of a variety of suitable materials, such as polymeric materials. Some examples of suitable materials include, without limitation, PMMA (polymethyl methacrylate), silicone, and glass.

Further understanding of various aspects of the invention can be obtained by reference to the following detailed description in conjunction with the associated drawings, which are described briefly below.

DETAILED DESCRIPTION

Figure 1A:
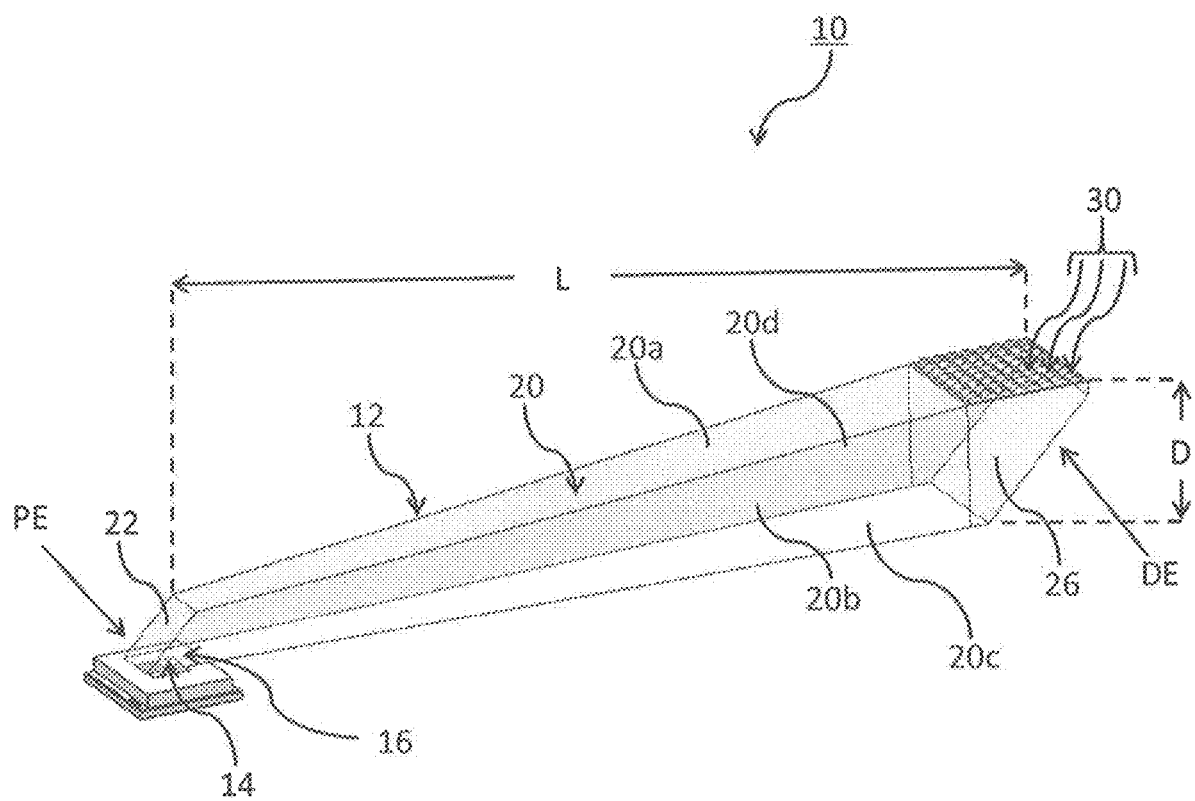
FIG. 1A schematically depicts a light-mixing system according to an embodiment.

The present invention is generally directed to light-mixing systems that employ a light pipe for mixing light received from one or more light sources. As discussed in more detail below, the light-mixing systems according to the present teachings can provide efficient light mixing while having a height that is significantly shorter than that of conventional light-mixing systems providing comparable light-mixing efficiency.

Various terms are used herein consistent with their ordinary meanings in the art. By way of clarification, certain terms are further described below.

An input surface is laterally separated from an output surface when two putative lines, each of which is normal to the center of one of those surfaces, are not co-extensive (i.e., they are not superimposed on one another).

The "lateral separation" or "lateral distance" between an input surface and an output surface of a light pipe refers to the shortest distance between two putative vectors normal to the centers of those surfaces along a direction normal to at least one of those vectors.

The "vertical separation" or "vertical distance" between an input surface and an output surface refers to the shortest distance between those surfaces along a direction parallel to a putative vector normal to at least one of those surfaces.

FIGS. 1A, 1B, 1C and 1D schematically depict an optical system 10 according to an embodiment of the present teachings, which includes a light pipe 12 that is optically coupled to a light source 14. In this embodiment, the light source 14 is a multi-color light emitting device (LED), such as an RGBW LED. In other embodiments, other light sources, including single-color LEDs can also be employed.

The light pipe 12 includes an input surface 16 that is positioned in proximity of the light source 14 so as to receive at least a portion of the light emitted by the light source 14. In some embodiments, the input surface 16 is configured and positioned relative to the light source 14 such that it receives at least about 70 percent, or at least about 80 percent, or at least about 90 percent, and preferably 100 percent, of the light energy generated by the light source.

The light pipe 12 further includes a light-guiding (herein also referred to as light-mixing) segment 20 that extends from a proximal end (PE) to a distal end (DE) and is optically coupled to the input surface 16 to receive at least a portion of the light entering the light pipe via the input surface. More specifically, in this embodiment, the light pipe 12 includes a reflective surface 22 that is positioned at a 45-degree angle relative to the input surface 16 for directing the light received via the input surface 16 into the light-mixing segment 20. In this embodiment, the reflective surface 22 is metalized. For example, a layer of a suitable metal 22a, such as gold or silver, can be deposited on the surface 22 so as to reflect the light incident thereon. In some embodiments, the thickness of such a metal layer can be, for example, in a range of about a few angstroms to about a few microns. In other embodiments, the reflective surface 22 can be configured so as to reflect the light incident thereon via total internal reflection.

Figure 1B:
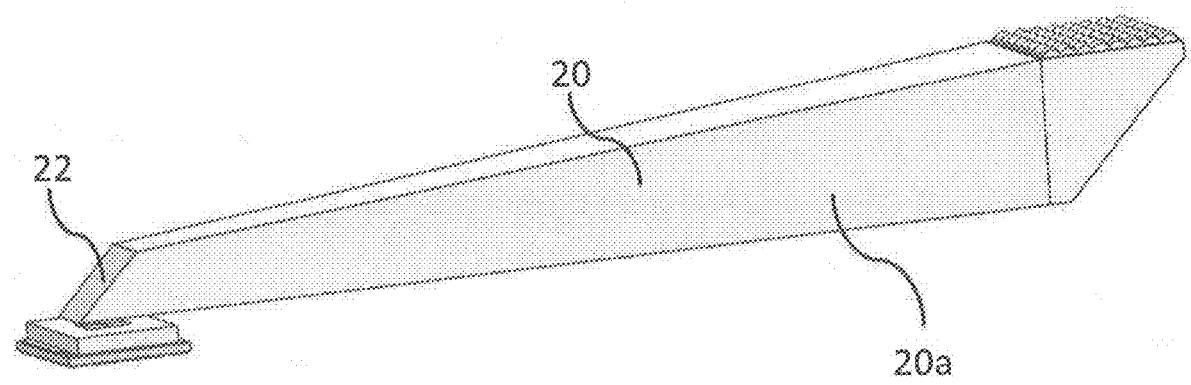
FIG. 1B is a schematic perspective view of the light pipe employed in the light-mixing system of FIG. 1A, FIG. 1C schematically depicts an output surface of an implementation of the light pipe of the system shown in FIGS. 1A and 1B, where the output surface includes a plurality of microlenses, FIG. 1D schematically depicts an output surface of an implementation of the light pipe of the system shown in FIGS. 1A and 1B, where the output surface includes surface texturing, FIG. 1E schematically depicts an output surface of an implementation of the light pipe of the system shown in FIGS. 1A and 1B, where the output surface includes both microlenses and surface texturing, FIG. 1F schematically depicts an output surface of a light pipe of a light-mixing system according to an embodiment, where the output surface comprises a plurality of microlenses FIG. 1G schematically depicts an output surface of a light pipe of a light-mixing system according to an embodiment, where the output surface comprises a plurality of microlenses having textured surfaces, FIG. 1H schematically depicts an output surface of a light pipe of a light-mixing system according to an embodiment, where the output surface comprises surface texturing, FIG. 1J schematically depicts an implementation of the light-mixing system of FIG. 1A in which a projection lens is optically coupled to an output surface of the system's light pipe, FIG. 1K schematically depicts a zoom lens employed as a projection lens in an embodiment of a light-mixing system according to the present teachings, where the zoom lens comprises two lens (the zoom lens is depicted in a narrow-beam configuration in this figure), FIG. 1L schematically depicts the zoom lens of FIG. 1K in a wide-beam configuration, FIG. 1M schematically depicts an implementation of the light-mixing system of FIG. 1A in which a single-lens zoom lens is employed in a narrow beam configuration, FIG. 1N schematically depicts the zoom lens of FIG. 1M in a wide-beam configuration, FIG. 2 schematically depicts an array of light-mixing systems according to the present teachings, FIGS. 3A and 3B schematically depict a light-mixing system according to another embodiment.
Figure 1C:
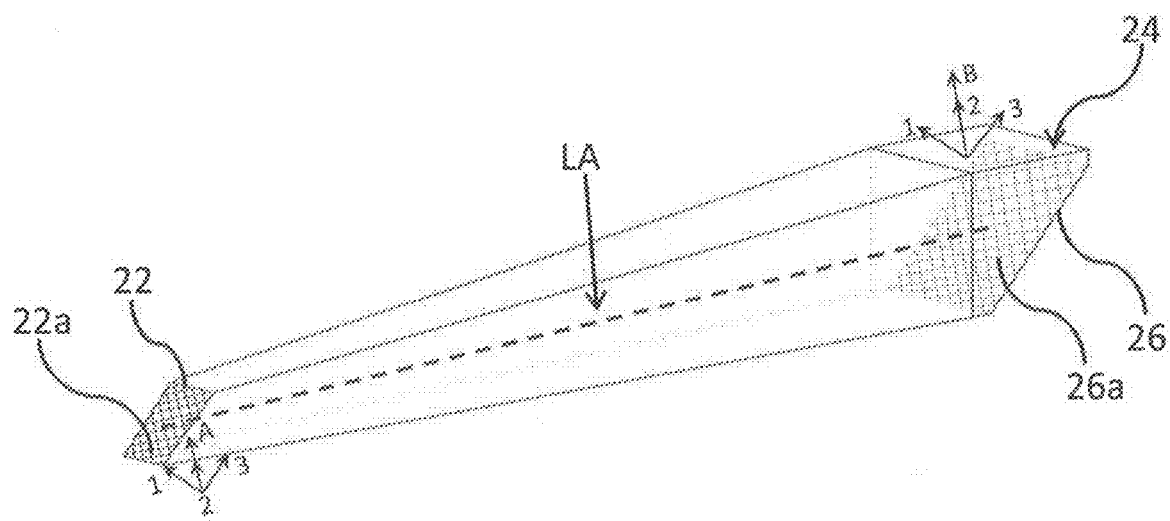
Figure 1D:
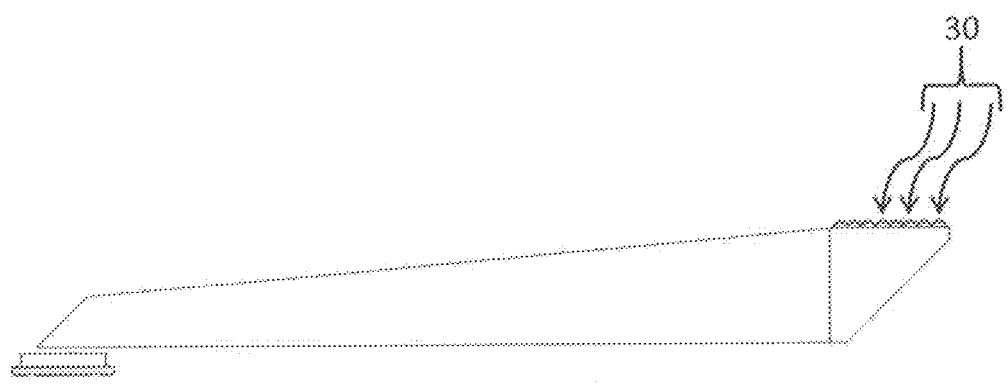

As shown schematically in FIG. 1C, in this embodiment, the input surface 16 is positioned relative to the light-mixing segment 20 such that a putative vector (A) normal to the input surface is substantially orthogonal to a longitudinal axis (LA) of the light-mixing segment 20.

In many embodiments, the light-mixing segment 20 has a polygonal cross-sectional shape, though cylindrical light-mixing segments can also be employed in some embodiments. In this embodiment, the light-mixing segment 20 includes four peripheral surface portions 20a, 20b, 20c, and 20d (herein collectively referred to as peripheral surface portions 21) that impart a square cross-sectional shape to the light-mixing segment 20. In this embodiment, these peripheral surface portions are configured to reflect light incident thereon via total internal reflection. In other embodiments, one or more of these surface portions can be metalized for reflecting light incident thereon. In this embodiment, the input surface 16 is contiguous with the peripheral surface portion 20b.

The light entering the light-mixing segment can undergo multiple reflections at surface portions 21 and advance along the light-mixing segment from the input surface 16 to reach a reflective surface 26 disposed at the distal end of the light-mixing segment 20, which reflects the light incident thereon onto an output surface 24. In this embodiment, the distal reflective surface 26 can be metalized. For example, the reflective surface 26 can be coated with a metal layer 26a having a thickness, for example, in a range of about a few angstroms to about a few microns. Similar to the input surface, the output surface 24 is also positioned relative to the light-mixing segment 20 such that a putative vector (B) normal to the output surface forms a non-zero angle relative to the longitudinal axis (LA) of the light-mixing segment 20. In this embodiment, this non-zero angle is about 90 degrees. Further, in this embodiment, the output surface 24 is contiguous with the peripheral surface portion 20c.

Further, in this embodiment, a plurality of microlenses 30 are optically coupled to the output surface so as to diffuse and/or redirect the light exiting the optical system via the output surface 24. In this embodiment, the output surface 24 incorporates the microlenses 30. In other embodiments, the microlenses 30 can be formed in a separate substrate (not shown), e.g., a plastic substrate, which can be coupled to the output surface 24.

Figure 1J:
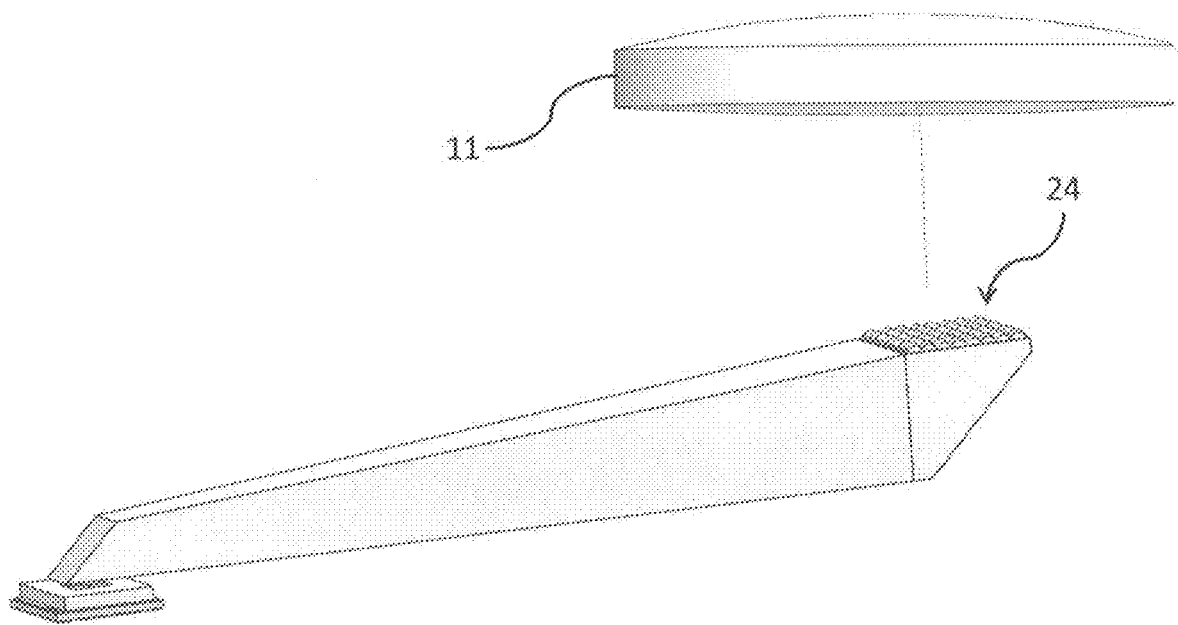
Figure 1E:
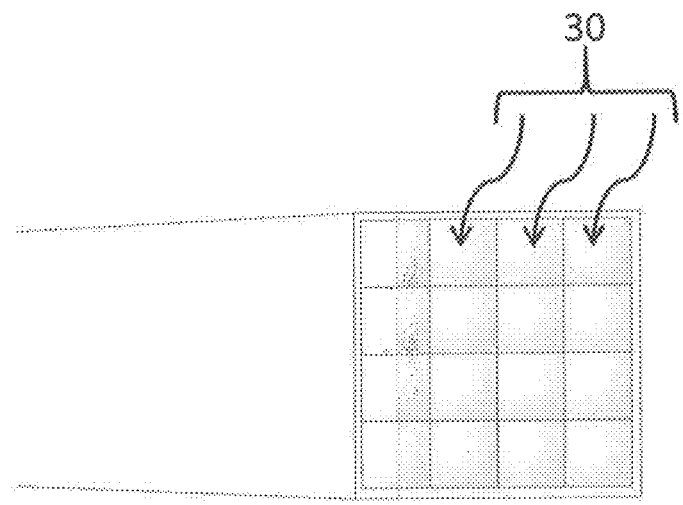
Figure 1F:
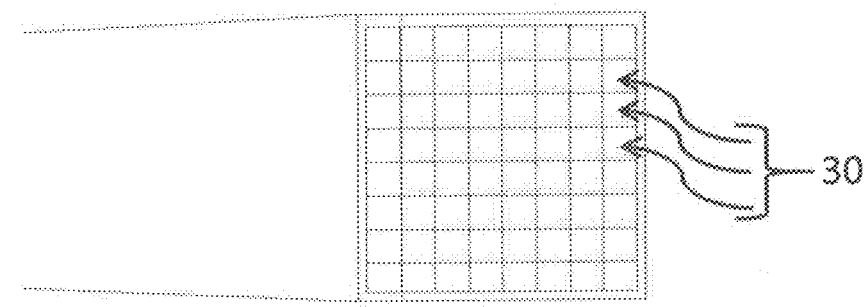

As shown schematically in FIGS. 1E and 1F, the microlenses 30 can have a variety of different sizes. By way of example, in some embodiments, the microlenses can have hemispherical shapes (See, e.g., FIG. 1D) with a diameter in a range of about 0.05 mm to about 1 mm. Further, in some embodiments, the pitch of the microlenses, i.e., the center-to-center spacing of the microlenses, can be, for example, in a range of about 0.1 mm to about 1 mm, e.g., in a range of about 0.1 mm to about 0.5 mm. In some embodiments, the microlenses can have an aspheric shape.

Figure 1G:
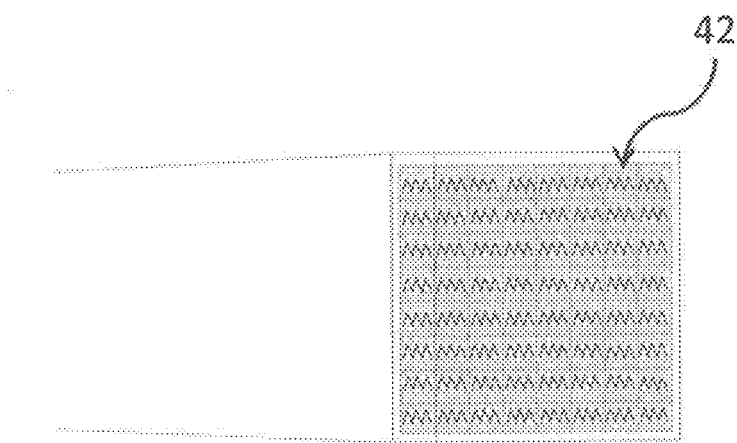

As shown schematically in FIG. 1G, in some embodiments, the surfaces of the microlenses 30 can be textured. For example, the surfaces of the microlenses 30 can include a plurality of projections 42 having a height, for example, in a range of about 0.01 mm to about 1 mm.

Figure 1H:
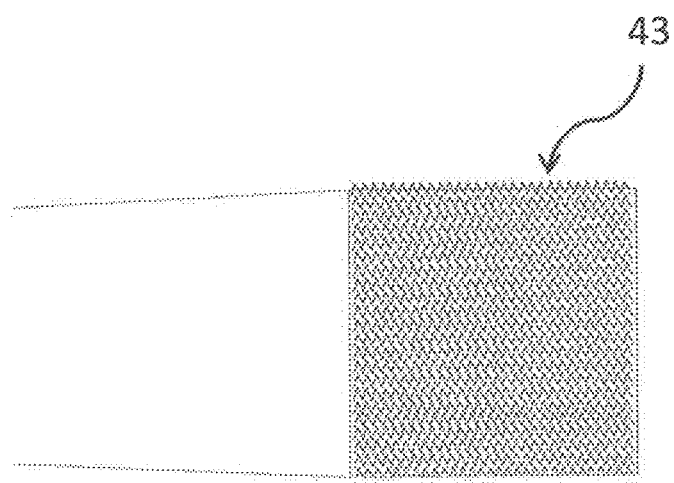

Further, as shown schematically in FIG. 1H, in some embodiments, the output surface can include texturing, e.g., a plurality of projections 43 having a height in a range of about 0.01 mm to about 1 mm, without microlenses.

Referring again to FIG. 1A, in this embodiment, a lateral separation (L) between the input and output surfaces can be, for example, in a range of about 20 mm to about 200 mm and a vertical separation (D) between those surfaces can be, for example, in a range of about 0 to about 20 mm. Further, the ratio of D/L can be in a range of about 0 to about 1, e.g., in a range of about 0.1 to about 0.5.

As shown in FIG. 1J, in some embodiments, a projection lens 11 can be optically coupled to the output surface 24 for projecting the light exiting the output surface 24 onto a target surface. In some embodiments, the lens 11 is in the form of a zoom lens assembly. In other embodiments, the optical system may not include a projection lens.

Figure 1K:
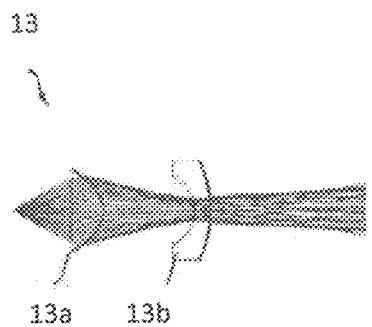
Figure 1L:
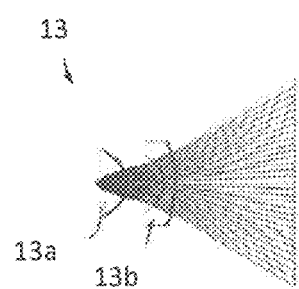
Figure 1M:
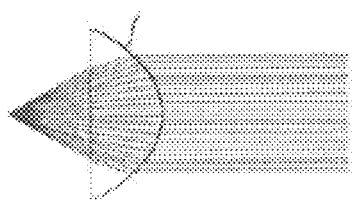
Figure 1N:
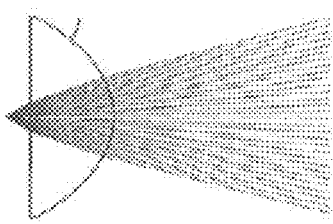

By way of example, FIGS. 1K and 1L schematically depict a zoom lens system 13 (herein also referred to as a doublet zoom) that includes a lens 13a providing a positive optical power and a lens 13b providing a negative optical power. At least one of the lenses, and in some cases both, is axially movable relative to the output surface of the light pipe to change the angular spread of the output beam between a narrow-beam spread (shown in FIG. 1K) and a wide-beam spread (shown in FIG. 1L). For example, the angular spread of the output beam can be varied between about 5 degrees to about 80 degrees. The use of a doublet lens system with one positive lens and one negative lens can be advantageous in applications where a wide beam range, e.g., divergence (FWHM) in a range of about 20 to about 80 degrees, is required. In embodiments in which the zoom lens includes a single positive lens (herein also referred to as a singlet zoom), in the "infrafocal position" (i.e., when the lens is placed close to the output surface of the light pipe), the positive power of the lens can reduce the divergence of the beam exiting through the output surface of the light pipe (See, FIGS. 1M and 1N for schematic representation of a narrow-beam and wide-beam spread of the output beam in a system in which a singlet zoom 15 is employed). In contrast, the positive and negative optical powers of the lenses of a doublet zoom allow achieving much wider beam spread, e.g., in a range of about 20 degrees to about 80 degrees (FWHM), when the zoom system is in the "intrafocal position." Further, in many embodiments, a multiple-lens zoom lens can provide other advantages, such as conventional advantages known in the art.

In some embodiments, the projection lens 11 can be a stationary lens that receives light emitted by the output surface of the light pipe and projects that light onto a target surface.

In some implementations, the light system 10 can transfer light from its input surface to its output surface with an efficiency in a range of about 30% to about 50%.

The light system 10 can provide a number of advantages. For example, it can provide excellent light mixing while having a significantly shorter height. In other words, while the length L of the light pipe can be sufficiently long so as to cause a desired degree of light mixing, the separation D between the input and output surfaces can be made much shorter than that in conventional systems.

With reference to FIG. 1B, in use, the light rays emitted by the light source 14, such as the exemplary light rays 1, 2, 3 are incident on the input surface 16 and enter the light pipe via the input surface. The reflective surface 22 redirects these light rays into the light-mixing segment 20. The rays undergo multiple reflections at the surface portions 21 to reach the reflective surface 26 at the distal end of the light-mixing segment. The rays are then reflected at this reflective surface 26 to reach the output surface 24. In this embodiment, the resultant propagation direction of the light rays incident on the input surface, as characterized, e.g., by the direction of the sum of the vectors associated with the incident light rays (i.e., the direction of the central ray 2 in this embodiment) is orthogonal to the resultant propagation direction of the light rays through the light-mixing segment 20 (in this case along the longitudinal axis (LA) of the light-mixing segment). Similarly, the resultant propagation direction of the light rays exiting the light pipe via the output surface 24 (i.e., rays 1', 2' and 3') is orthogonal to the resultant propagation direction of the light rays traversing the light-mixing segment 20. In other embodiments, the input and output surfaces can be configured such that the resultant propagation directions of the light rays entering or exiting the light pipe can make non-zero angles other than 90 degrees relative to the longitudinal direction of the light-mixing segment 20.

Figure 2:
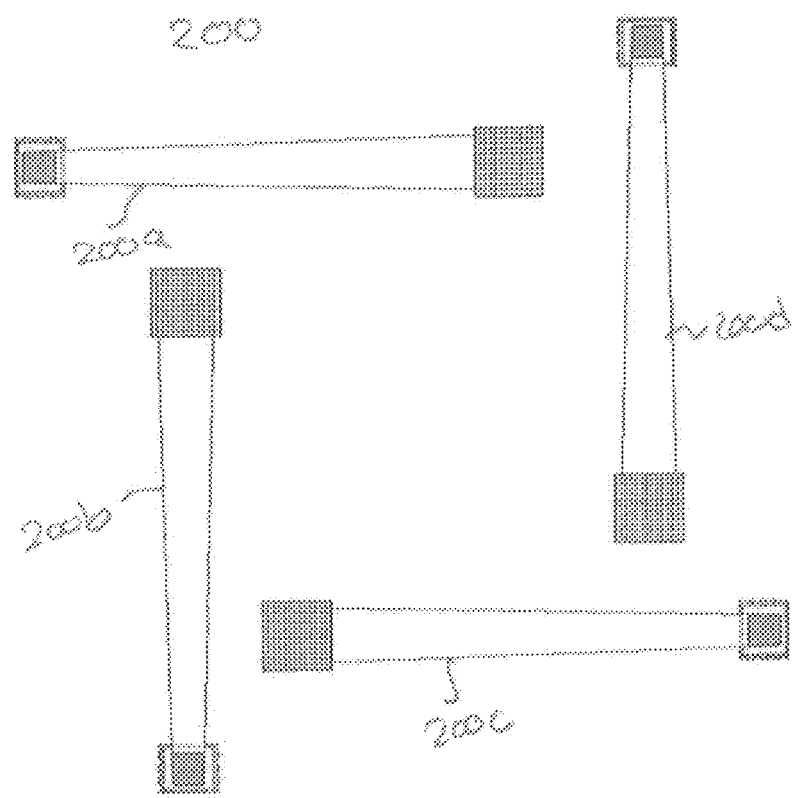

FIG. 2 schematically depicts a light array 200 that is formed by using four of the light-mixing systems 10 discussed above. More specifically, the light array 200 includes light-mixing systems 200a, 200b, 200c, and 200d, where the light pipes of the light mixing system 200a is substantially parallel to the light pipe of the light-mixing system 200c and the light pipe of the light-mixing system 200b is substantially parallel to the light pipe of the light-mixing system 200d. Further, the pair of light mixing systems (200a/200c) are substantially orthogonal to the pair of light mixing systems (200b/200d). In some embodiments of the light array 200, the light-mixing systems 200a, 200b, 200c, and 200d can be positioned relative to one another such that the output light of the systems at least partially overlap when projected onto a desired target.

Figure 3A:
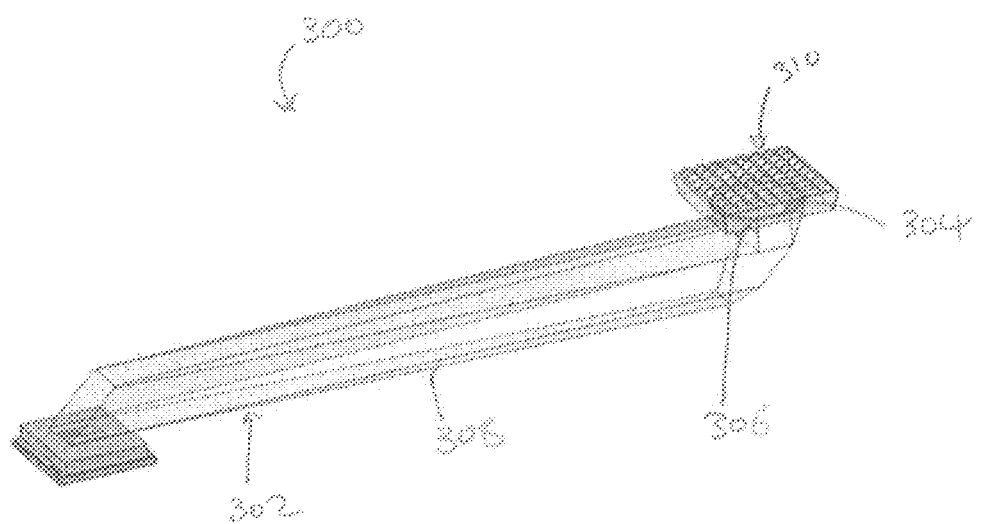
Figure 3B:
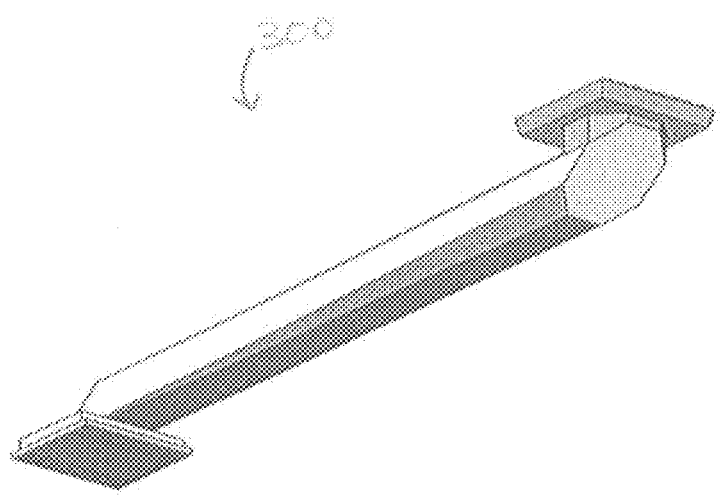

FIGS. 3A and 3B schematically depict another embodiment 300 of a light mixing system according to the present teachings. The light-mixing system 300 is similar to the light-mixing system 10 discussed above except that the light pipe 302 employed in this system has an octagonal cross-sectional shape. Further, an output surface 304 of the light-mixing system 300 is disposed at the end of a segment 306 that protrudes above a light mixing segment 308 of a light pipe 302 of the light-mixing system. Similar to the previous embodiment, the light-mixing system 300 can include a plurality of microlenses and/or surface texturing 310 for diffusing and/or redirecting the light exiting the output surface 304. The light-mixing system 300 can optionally include a projection lens (not shown), such as a zoom lens, that can be optically coupled to the microlenses/surface texturing 310.

Figure 4A:
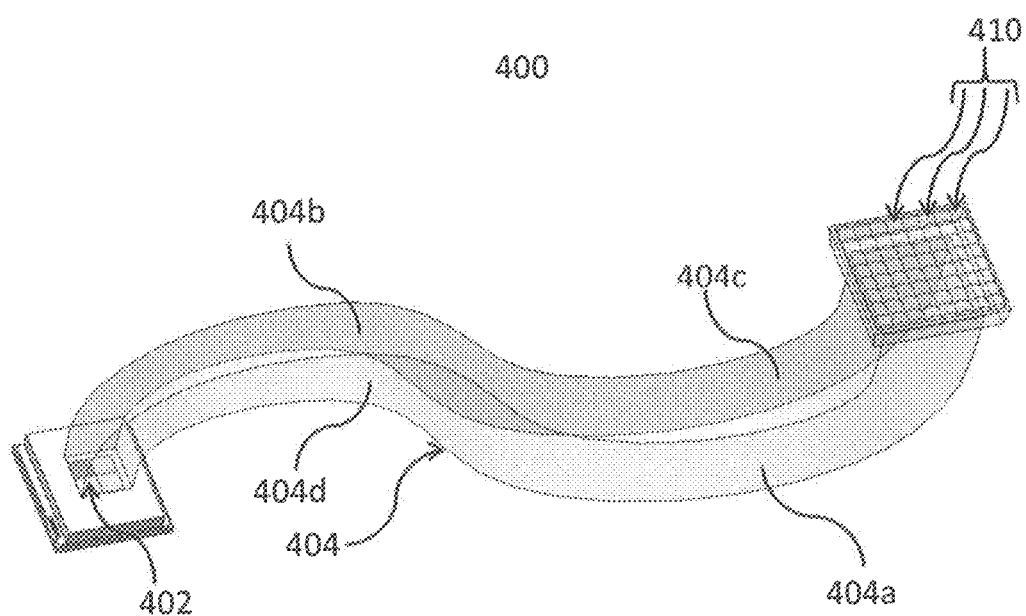
FIG. 4A is a schematic perspective view of a light-mixing system according to another embodiment of the present teachings.
Figure 4B:
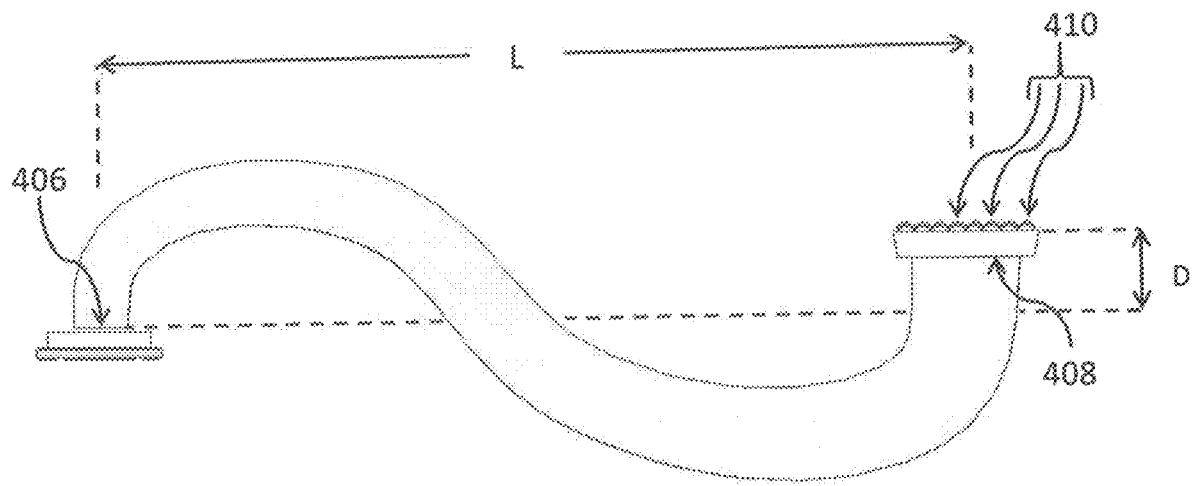
FIG. 4B is a schematic cross-sectional view of the light-mixing system depicted in FIG. 4A.

FIGS. 4A and 4B schematically depict another embodiment 400 of a light-mixing system according to the present teachings, which includes a light source 402 and a light pipe 404 to which the light source is optically coupled. The light pipe 404 has a curved profile and extends from an input surface 406 to an output surface 408. More specifically, in this embodiment, the light pipe 404 has a serpentine shape. Similar to the previous embodiment, the light source 402 is a multi-color LED, though other light sources can also be employed.

In this embodiment, the serpentine-shaped light pipe 404 includes surface portions 404a, 404b, 404c, and 404d (herein collectively referred to as surface portions 405) that are arranged to impart a square cross-sectional shape to the light pipe. The light emitted by the light source 402 enters the light pipe via the input surface 406 and undergoes total internal reflection at the peripheral surface portions 405 of the light pipe, thereby advancing along the light pipe to reach the output surface 408 through which the light exits the light pipe.

A plurality of microlenses 410 are coupled to the output surface 408 for diffusing and/or redirecting the light exiting through the output surface. In this embodiment, the microlenses are implemented as a separate unit (e.g., in a plastic substrate), which is attached to the output surface of the light pipe. In other embodiments, the output surface itself can carry the microlenses. In addition or alternatively, the output surface 408 can include surface texturing, such as that discussed above in connection with the previous embodiments.

With continued reference to FIGS. 4A and 4B, the input surface 406 and the output surface 408 are laterally separated from one another by a distance L and are vertically separated from one another by a distance D. In this embodiment, the ratio of D to L (D/L) can be, for example, in a range of 0 to about 1. In some embodiments, the lateral distance L can be, for example, in a range of about 20 mm to about 200 mm and the vertical distance D can be, for example, in a range of 0 to about 20 mm.

Figure 4C:
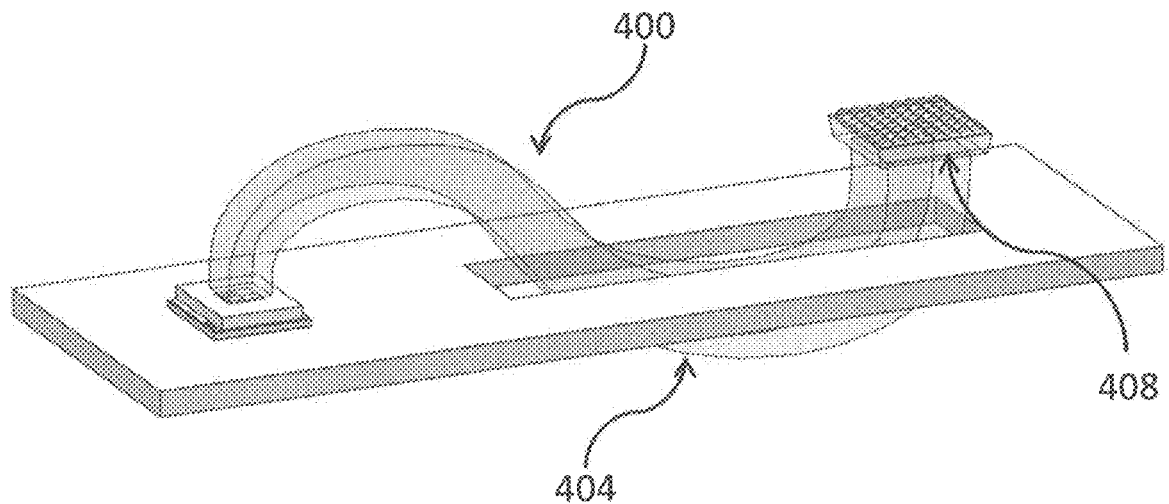
FIG. 4C is a schematic view of an implementation of the light-mixing system of FIG. 4A in which a portion of the light pipe is positioned vertically below the surface of the light source.
Figure 4D:
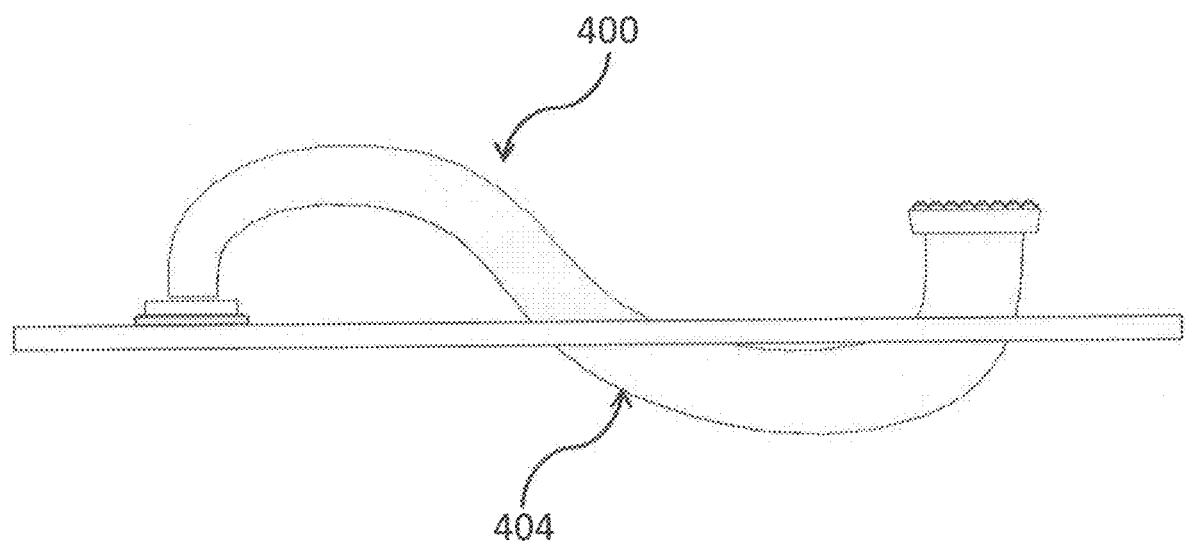
FIG. 4D is a cross-sectional view of the light-mixing system depicted in FIG. 4C.

As shown schematically in FIGS. 4C and 4D, in some embodiments, a portion of the light pipe 404 can be vertically below the surface of the light source 402. While in this embodiment, the height of the output surface 408 relative to the lowest point of the light pipe is greater than the height of the input surface 406, in other embodiments, the light pipe can be curved such that the height of the output surface 408 is less than that of the input surface 406.

Figure 4E:
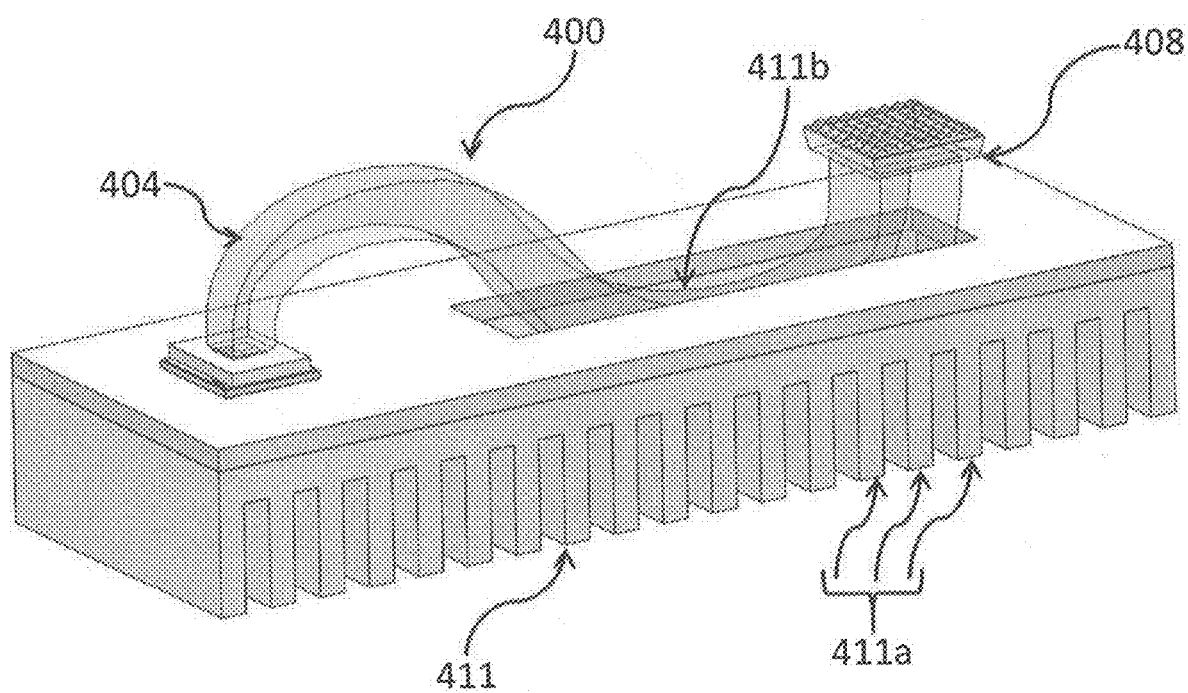
FIG. 4E is a perspective schematic view of an implementation of the light-mixing system of FIG. 4C in which a heat sink is coupled to be the light source.
Figure 4F:
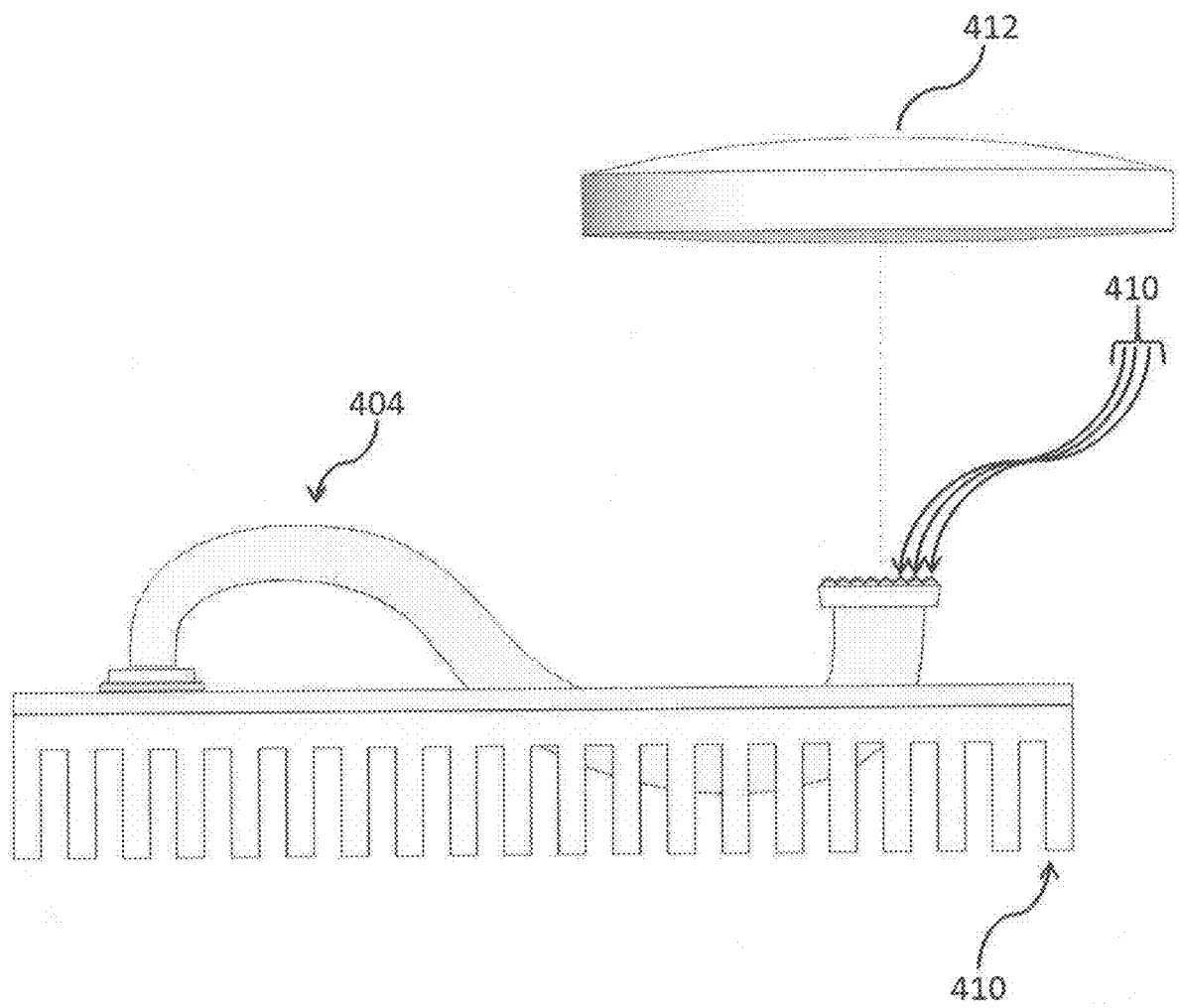
FIG. 4F is a cross-sectional schematic view of the light-mixing system depicted in FIG. 4E with the addition of a projection lens optically coupled to the output surface of the light pipe.

With reference to FIGS. 4E and 4F, in some embodiments, a heat sink 411 can be coupled to the light source 402 to facilitate removal of heat from the light source. In this embodiment, the heat sink 411 includes a plurality of fins 411a that provide an increased surface area from which the heat generated by the light source can be efficiently dissipated into the external environment. In this embodiment, the heat sink 411 includes an opening 411b that accommodates a portion of the light pipe 404 that is positioned vertically below the light source 402.

As shown schematically in FIG. 4F, in some embodiments, a lens 412 can be optically coupled to the microlenses 410 to receive the light exiting the light pipe 400, e.g., to project the light onto a target surface. In some embodiments, the lens 412 can function as a zoom lens. The use of a curved light pipe can provide certain advantages. For example, it can allow efficient light mixing by increasing the path length of the light through the light pipe while ensuring that the height of the system, which can be characterized by the vertical separation D between the input and output surfaces, is significantly less than the height of a conventional system providing the same degree of light mixing.

FIGS. 5A, 5B, 5C, 5D schematically depict a light-mixing system 500 according to another embodiment, which includes a hemispherically-shaped light pipe 502 that extends from an input surface 502a to an output surface 502b. In this embodiment, the hemispherically-shaped light pipe 502 includes four peripheral surfaces, such as surfaces 503a 503b, and 503c (the surface opposed to the surface 502c is not visible in this figure), which are herein referred to collectively as peripheral surfaces 503. The peripheral surfaces 503 impart a square cross-section to the light pipe, though in other embodiments the cross-sectional shape of the light pipe can be different, e.g., hexagonal, or octagonal. Similar to some of the previous embodiments, the peripheral surfaces 503 are configured so as to reflect, via total internal reflection, the light incident thereon. Further, similar to some of the previous embodiments, a plurality of microlenses 504 are coupled to the output surface 502b to diffuse and/or redirect the light exiting the light pipe via the output surface. Again, similar to some of the previous embodiments, in addition to or instead of the microlenses, the output surface 502b can include surface texturing for diffusing the light exiting the light pipe via the output surface. Further, similar to the previous embodiment, a projection lens, such as a zoom lens, can be optionally optically coupled to the microlenses 504 to receive light therefrom and direct the received light onto a target surface.

The input surface is optically coupled to a light source 506, which can be, for example, a multi-color LED such as an RGBW. In this embodiment, the general direction along which the light from the light source enters the light pipe is substantially opposite to the general direction along which the light exits the light pipe via the output surface 502b.

In some implementations, the light-mixing system 500 can transfer light received at its input surface to its output surface with an efficiency as high as about 74%, or as high as about 80%, or as high as about 90%.

Figure 5A:
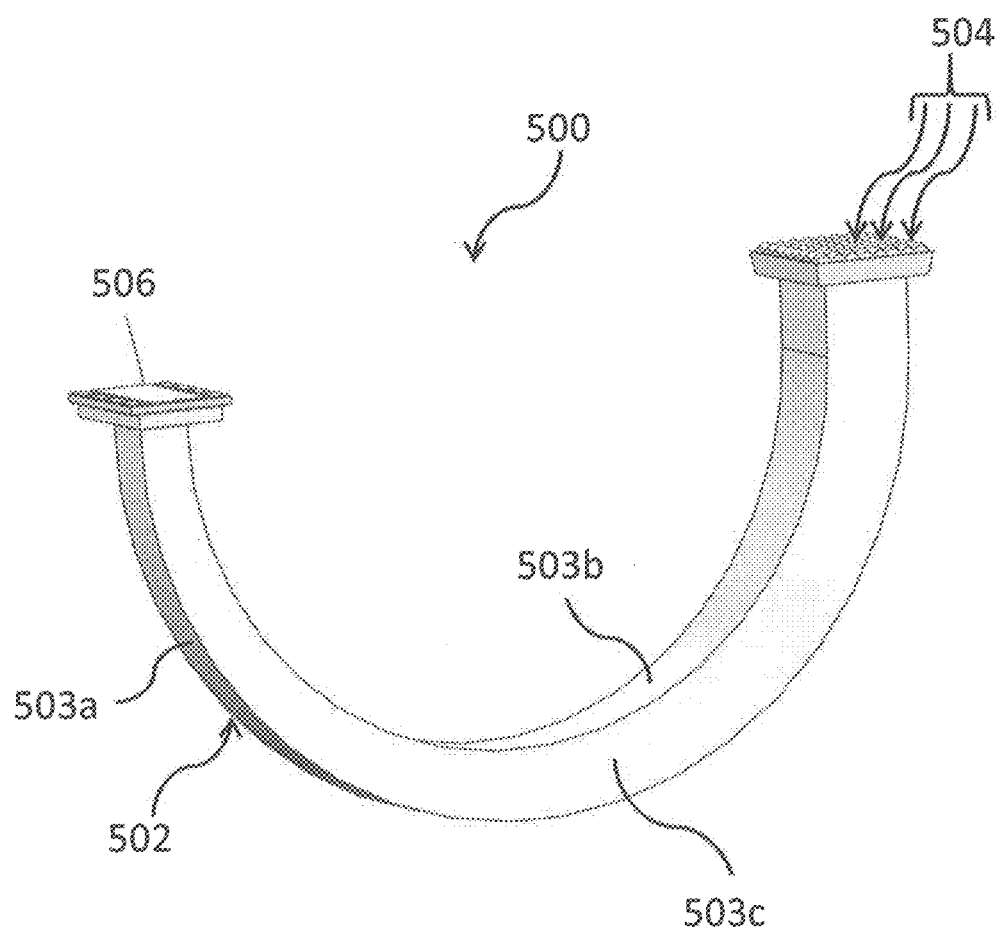
FIG. 5A is a schematic perspective view of a light-mixing system according to another embodiment of the present teachings.
Figure 5B:
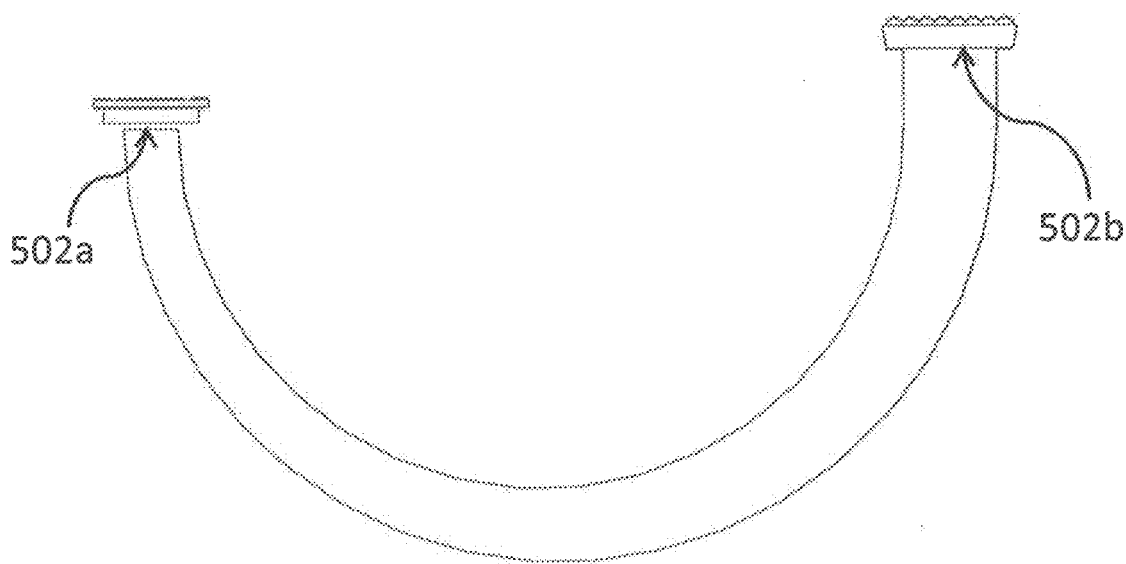
FIG. 5B is a schematic cross sectional view of the light-mixing system depicted in FIG. 5A.
Figure 5C:
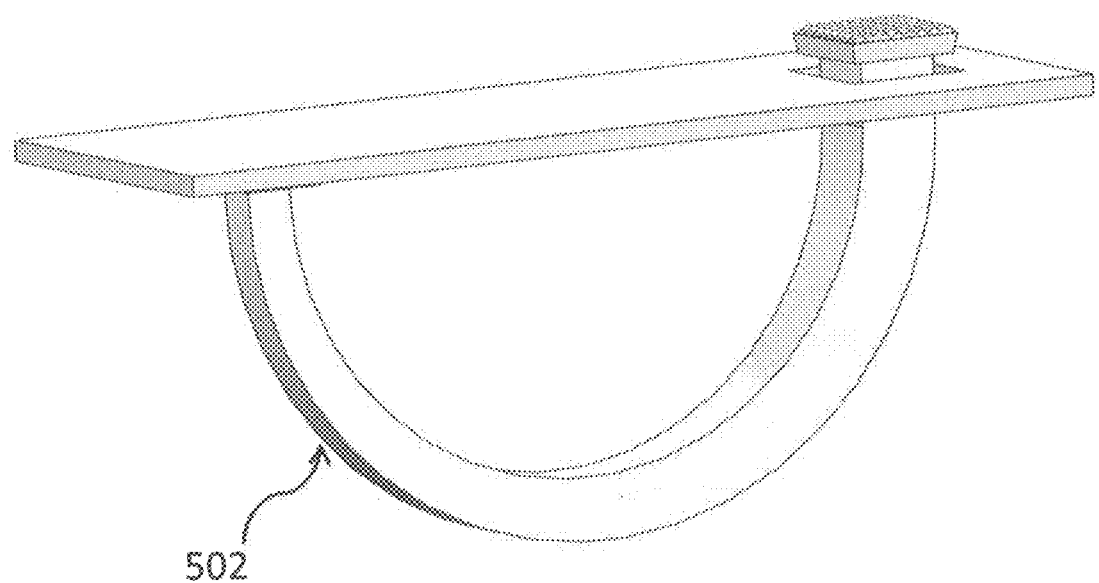
FIG. 5C is another schematic view of the light-mixing system depicted in FIG. 5A.
Figure 5D:
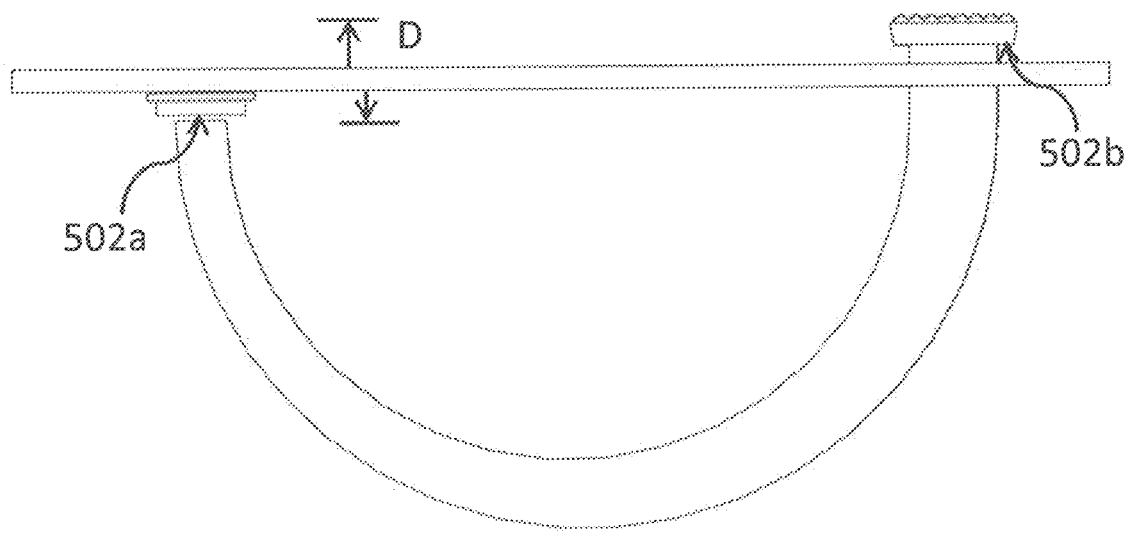
FIG. 5D is another schematic view of the light-mixing system depicted in FIG. 5A, FIG. 5E schematically depicts an embodiment of the light-mixing system of FIG. 5A in which a heat sink is thermally coupled to the light source.

In this embodiment, the input surface 502a and the output surface 502b are vertically separated from one another. By way of example, as shown in FIGS. 5C and 5D, the input surface 502a and the output surface 502b are vertically separated from one another by a distance (D). While in this embodiment, the output surface is vertically disposed above the input surface, in other embodiments, the output surface 502b can be vertically positioned below the input surface.

Figure 6A:
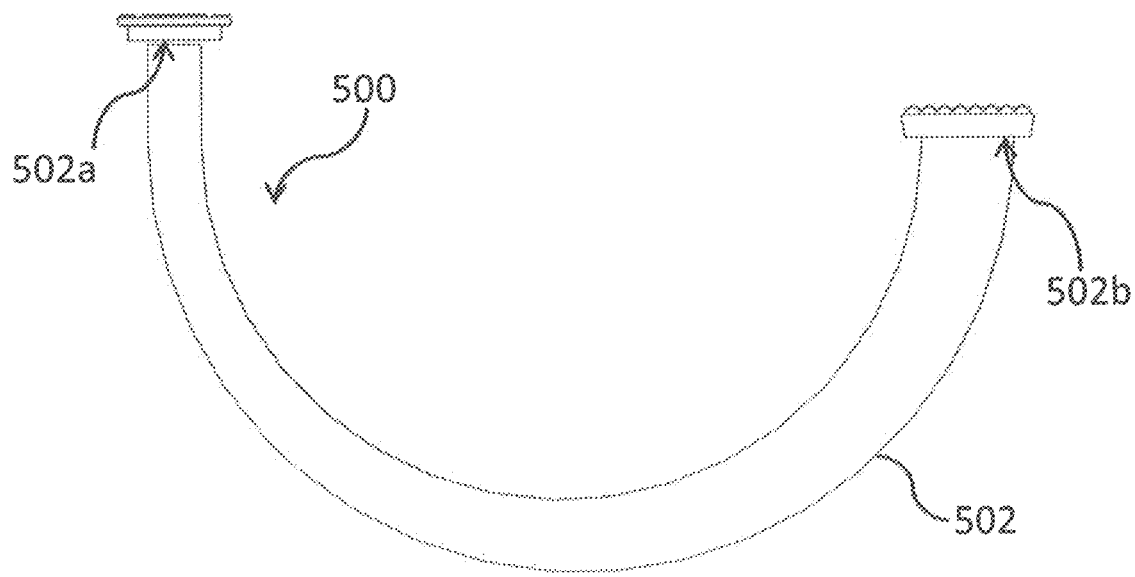
FIG. 6A is a schematic view of a light-mixing system according to another embodiment of the present teachings.
Figure 6B:
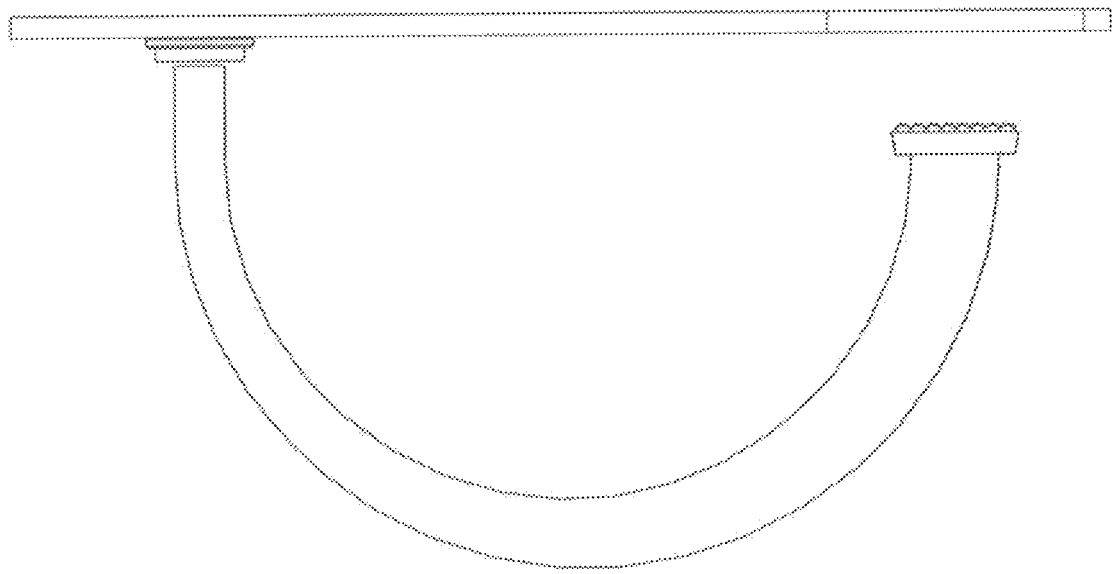
FIG. 6B is a schematic view of another implementation of the light-mixing system depicted in FIG. 6A.

By way of example, FIGS. 6A and 6B schematically depict another embodiment of the light mixing system 500 in which the output surface 502b is vertically positioned below the input surface 502a. In general, as the length of the arcuate light-mixing waveguide between the input and output surfaces increases, so does the light mixing capability of the optical system.

Figure 5E:
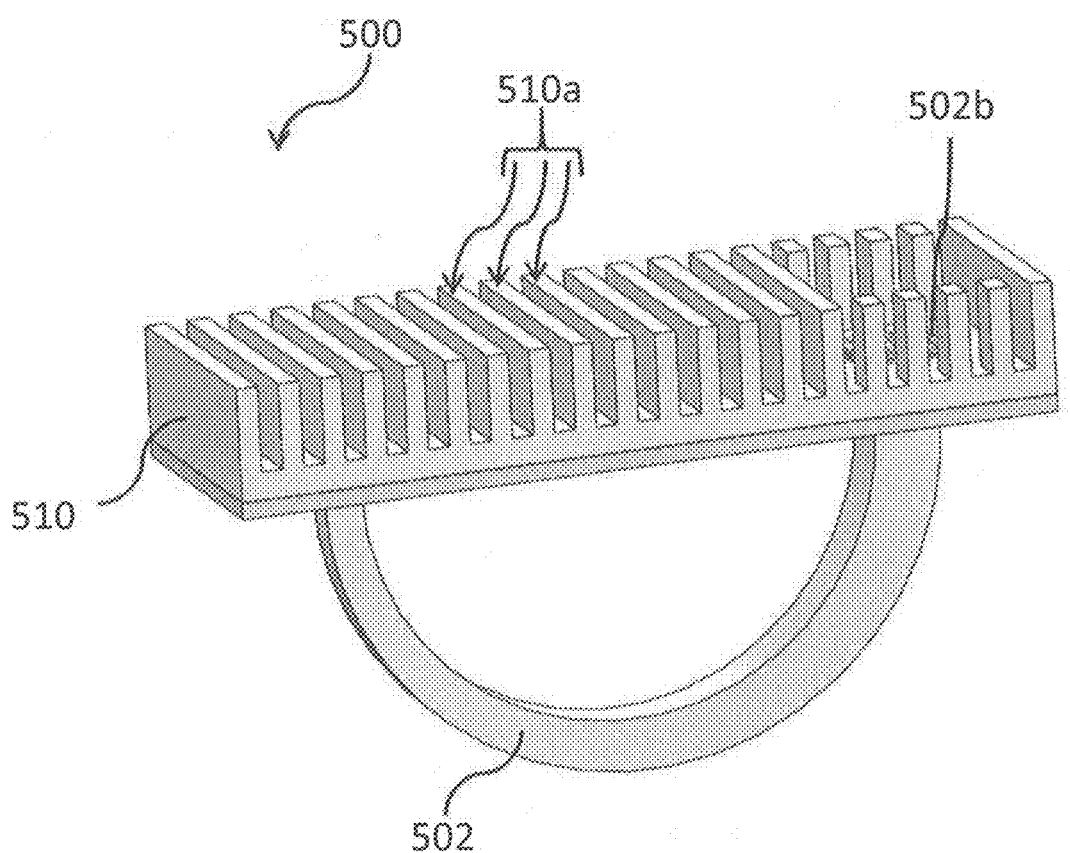
FIG. 5F is another schematic view of the light-mixing system of FIG. 5E.
Figure 5F:
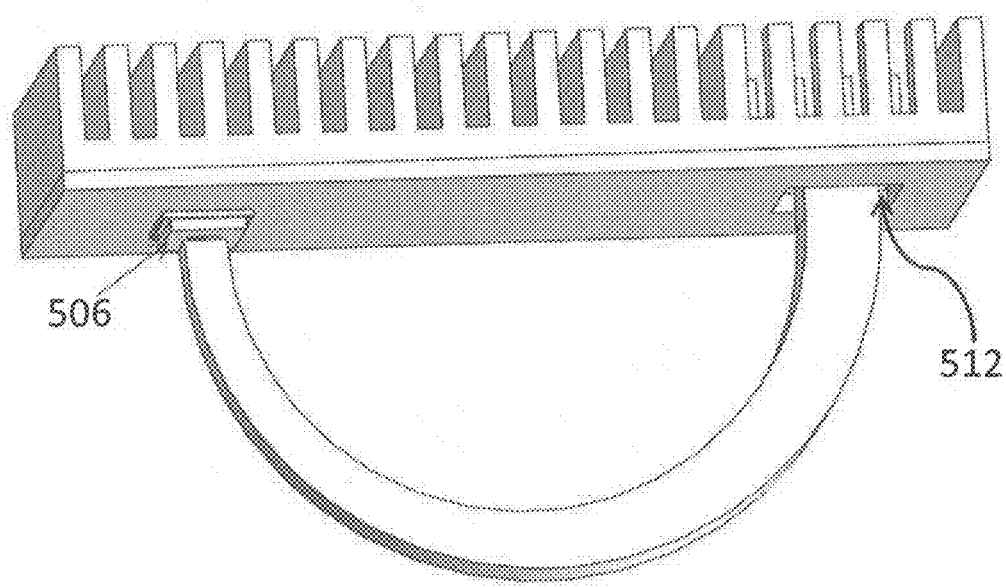

With reference to FIGS. 5E and 5F, in some embodiments, the light-mixing system 500 includes a heat sink 510 that is thermally coupled to the light source 506 for removing heat therefrom. The heat sink 510 can include a plurality of fins 510a for facilitating the removal of heat from the light source 506. As in this embodiment the output surface 502b of the light pipe 502 is positioned vertically above the light source 506, the heat sink includes an opening 512 through which the distal end of the light pipe extends.

Figure 6C:
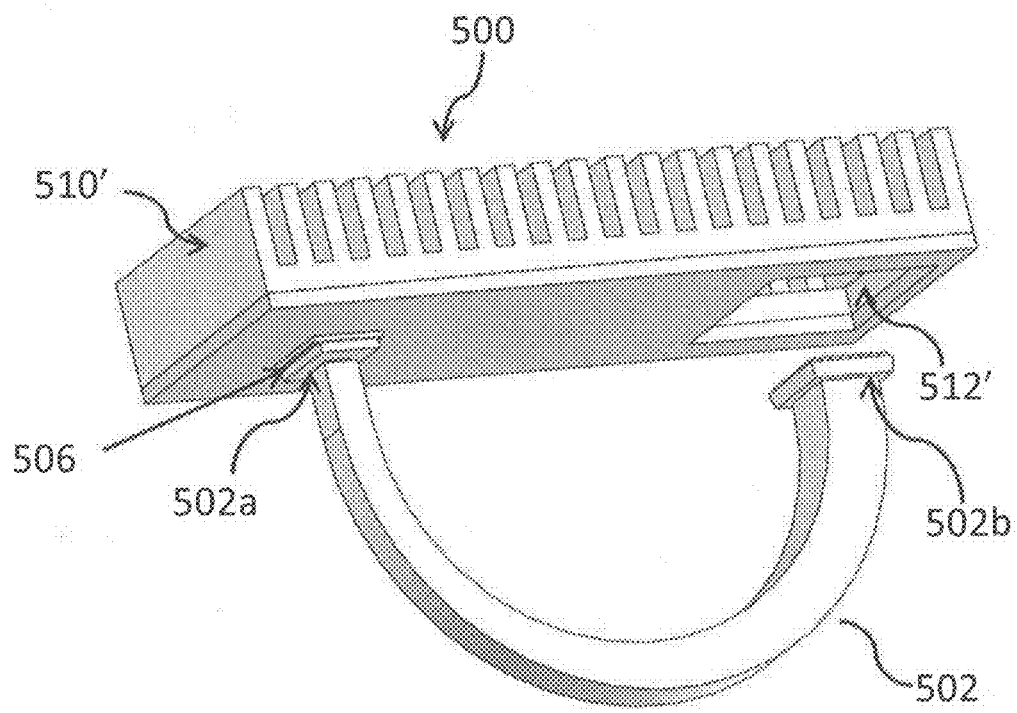
FIG. 6C is a schematic view of an embodiment of the light-mixing system of FIG. 6A in which a heat sink is thermally coupled to the light source.
Figure 6D:
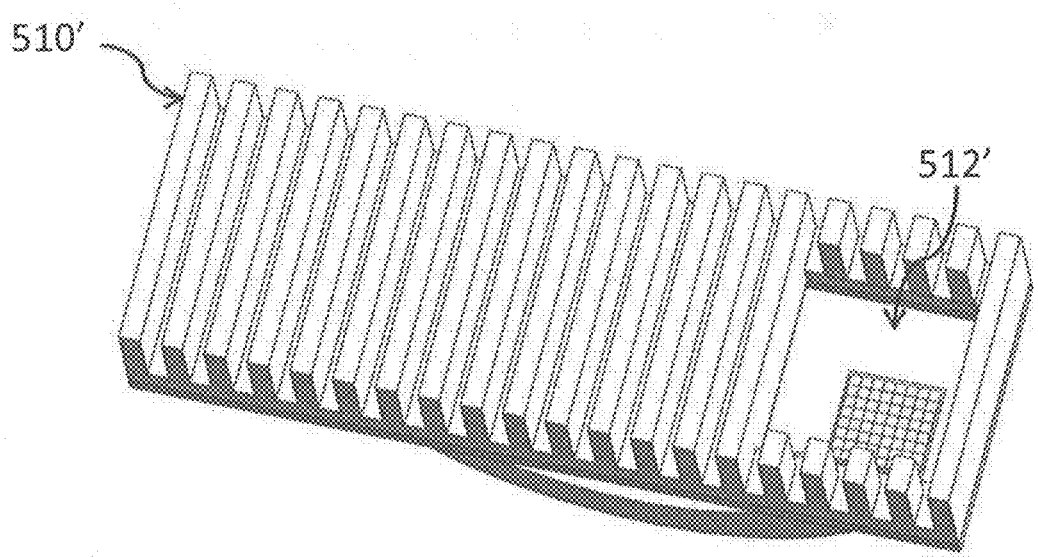
FIG. 6D is another schematic view of the light-mixing system depicted in FIG. 6C.

FIGS. 6C and 6D depict another embodiment of the light-mixing system 500 in which the output surface 502b of the light pipe 502 is positioned vertically below the input surface 502a and a heat sink 510' is thermally coupled to the light source 506 to facilitate the removal of heat generated by the light source. The heat sink 510' includes an opening 512' that allows the passage of light exiting the light pipe 502 via its output surface 502b to the external environment.

Figure 6E:
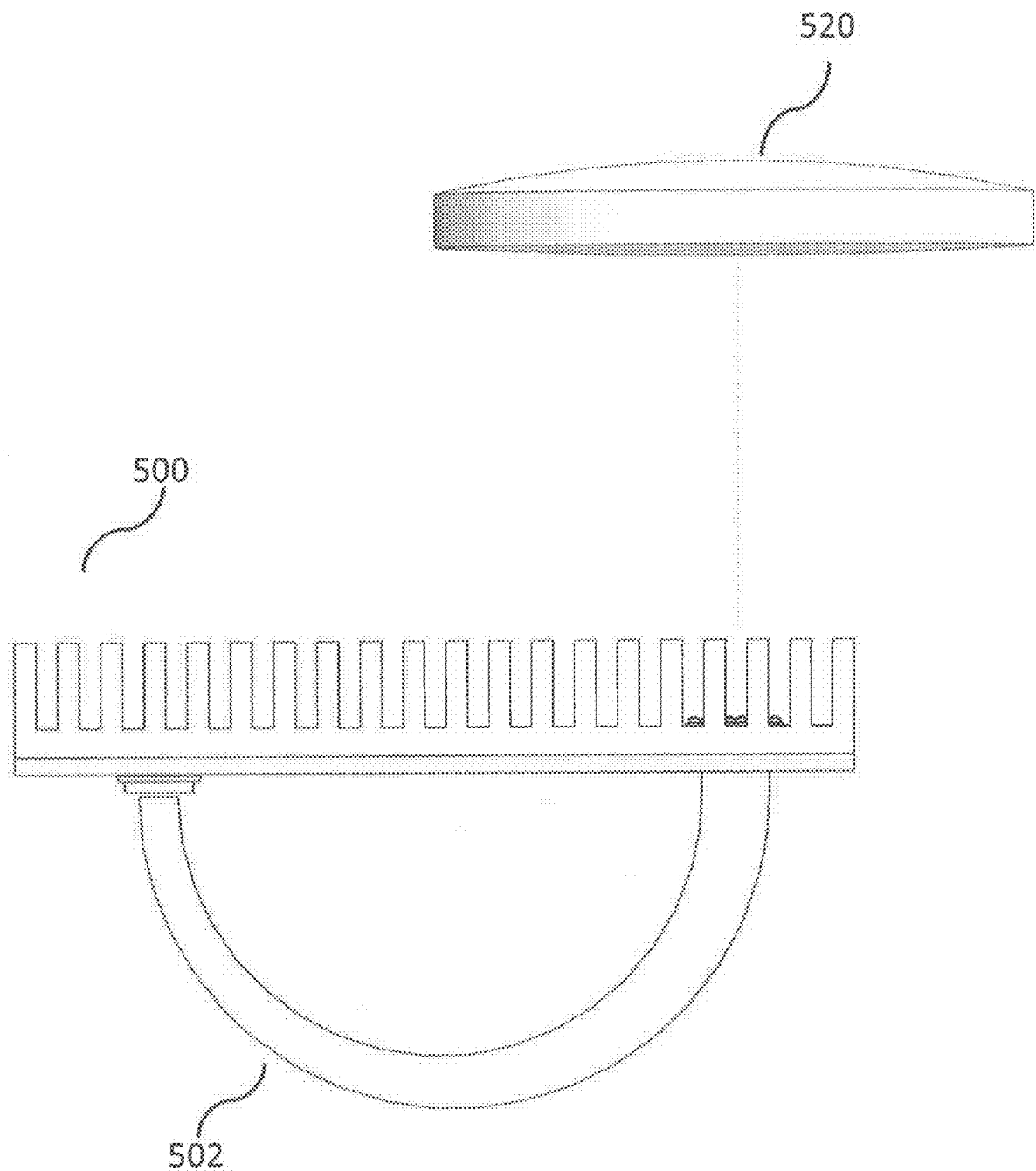
FIG. 6E is a schematic view of an embodiment of the light-mixing system of FIG. 6A in which a projection lens is optically coupled to the output surface of the light pipe.

FIG. 6E schematically depicts an embodiment of the light-mixing system 500 in which a lens 520 is optically coupled to the output surface of the light pipe 502 to shape and/or redistribute the light rays, e.g., to focus the light rays onto a target surface. In some embodiments, the lens 520 can be a zoom lens, e.g., a zoom lens formed by a pair of lenses having positive and negative optical powers.

Figure 7:
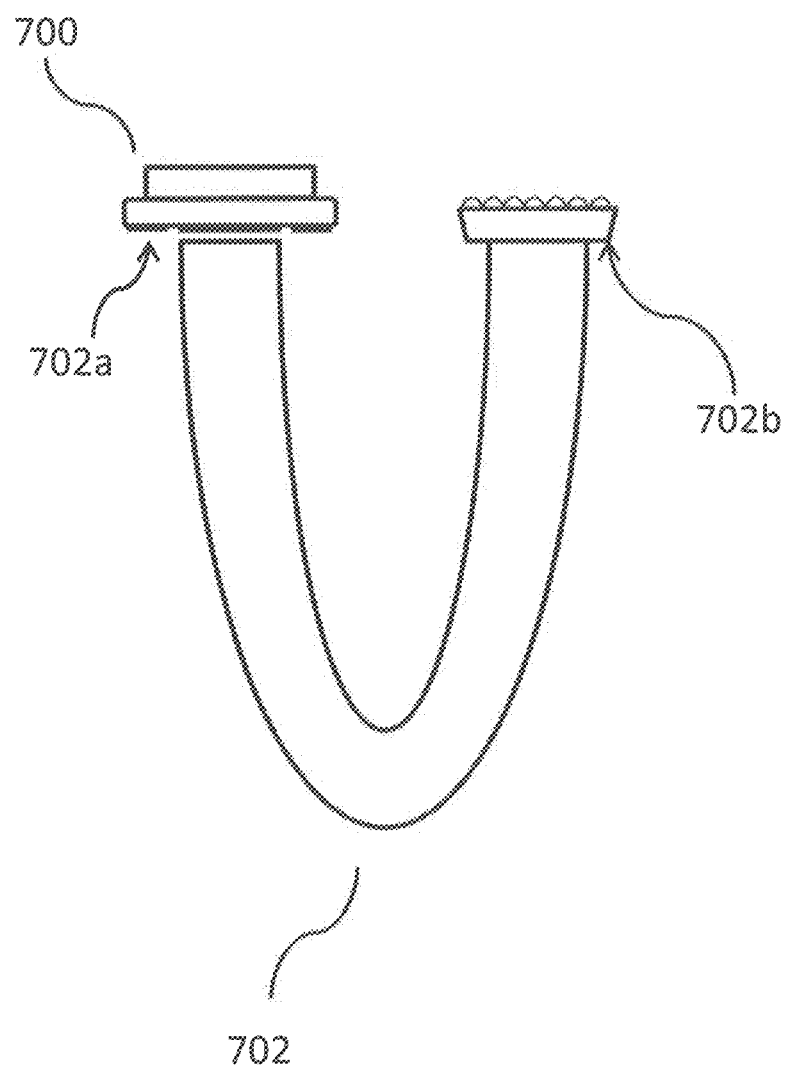
FIG. 7 is a schematic view of a light-mixing system according to another embodiment of the present teachings.

By way of further illustration, FIG. 7 schematically depicts another embodiment of a light-mixing system 700 having a curved light pipe (light-guiding waveguide) 702 that extends from an input surface 702a, which can receive light from a light source (not shown in this figure), to an output surface 702b through which the light can exit the light pipe. In this embodiment, the input and the output surfaces are placed side-by-side in close proximity to one another. In other embodiments, the light pipe can be configured such that the input and the output surfaces are placed side-by-side and in contact with one another. In other words, each of the lateral and the vertical distance between the input and the output surface can be zero.

With reference to FIGS. 8A, 8B, and 8C, in some embodiments, a light mixing system 800 includes a light pipe 802 that extends from an input surface 802a to an output surface 802b. In this embodiment, the light pipe 802 forms an arc such that the input and output surfaces 802a and 802b are oriented at a 90-degree angle relative to one another. In other words, putative vectors normal to the input and output surfaces 802a and 802b are orthogonal to one another. Thus, the light pipe can redirect an input beam by 90 degrees to illuminate a desired target surface.

The input surface 802a is optically coupled to a light source 804, which can be, for example, an LED or a combination of LEDs providing light of different colors. The light rays entering the light pipe 802 undergo total internal reflection at the peripheral surfaces of the light pipe to reach the output surface 802b. While in this embodiment the light pipe has a square cross-sectional profile, in other embodiments, it can have other cross-sectional profiles, such as hexagonal or octagonal.

In this embodiment, a plurality of microlenses 805 are optically coupled to the output surface of the light pipe 800 to redistribute and/or reshape the light as it exits the output surface. In some embodiments, the surfaces of the microlenses can be textured, for example, in a manner discussed above in connection with the previous embodiments. By way of example, such surface texturing can be characterized by a plurality of projections having heights in a range of about 0.01 mm to about 1 mm. In other embodiments, such surface texturing can be applied to the output surface 802b in absence of any microlenses. In this embodiment, the microlenses are formed in a separate unit 807, e.g., a plastic unit, that is then coupled to the output surface 802b. In other embodiments, the microlenses can be incorporated into the output surface 802b.

Figure 8D:
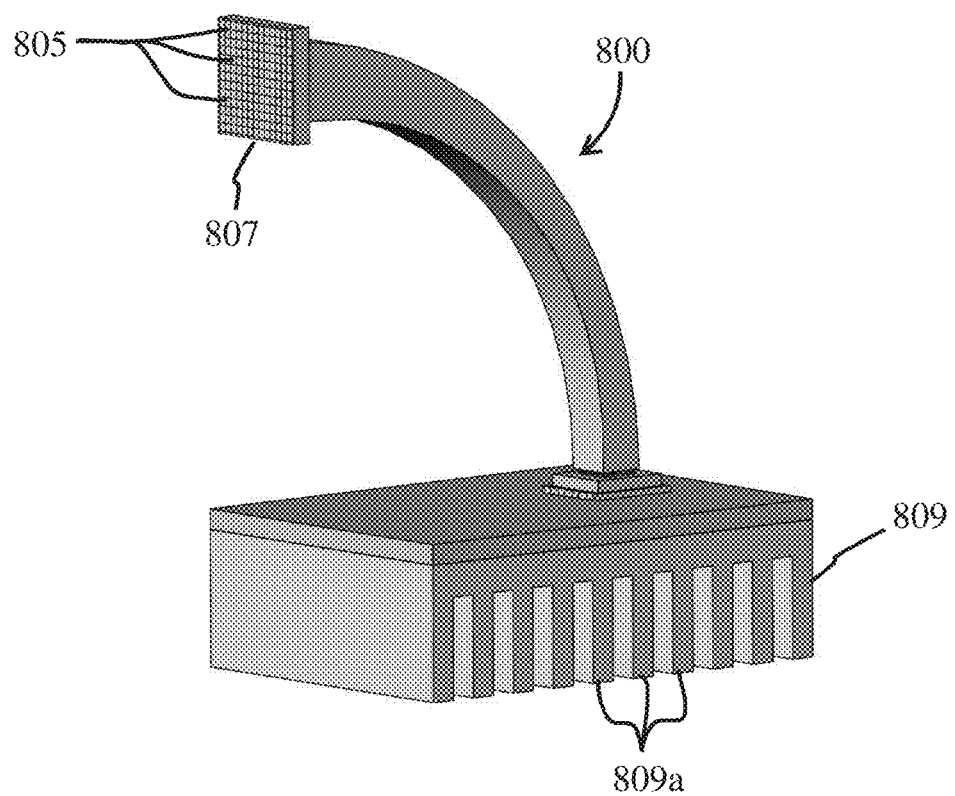
FIG. 8A is a schematic view of a light system according to an embodiment in which the input and output surface are oriented at a 90-degree angle relative to one another.
FIG. 8B is a perspective schematic view of the light system depicted in FIG. 8A.
FIG. 8C is another perspective schematic view of the light system depicted in FIG. 8A, illustrating a plurality of microlenses that are optically coupled, FIG. 8D schematically depicts an embodiment of the light system shown in FIG. 8A in which a heat sink in thermally coupled to a light source providing light to the light pipe of the light system.
FIG. 8E is a cross-sectional schematic view of the light system illustrated in FIG. 8D, FIG. 8F schematically illustrates a light system according to an embodiment in which a projection lens is optically coupled to an output surface of a light pipe of the light system.
FIG. 8G is a perspective schematic view of the light system depicted in FIG. 8F.
Figure 8E:
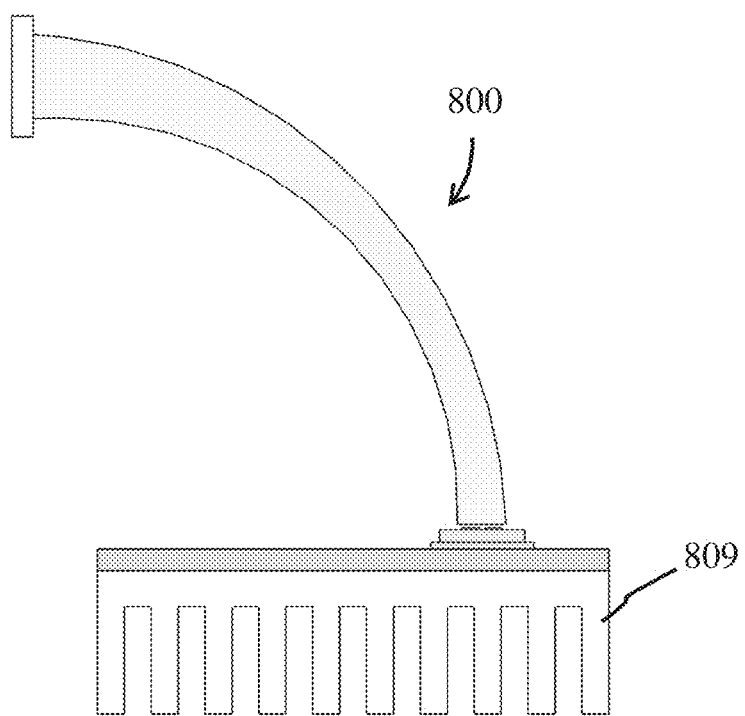

With reference to FIGS. 8D and 8E, in some embodiments a heat sink 809 can be thermally coupled to the light source 804 to remove heat generated by the light source. The heat sink 809 includes a plurality of fins 809a that provide a large surface area for facilitating the removal of heat from the light source.

Figure 8F:
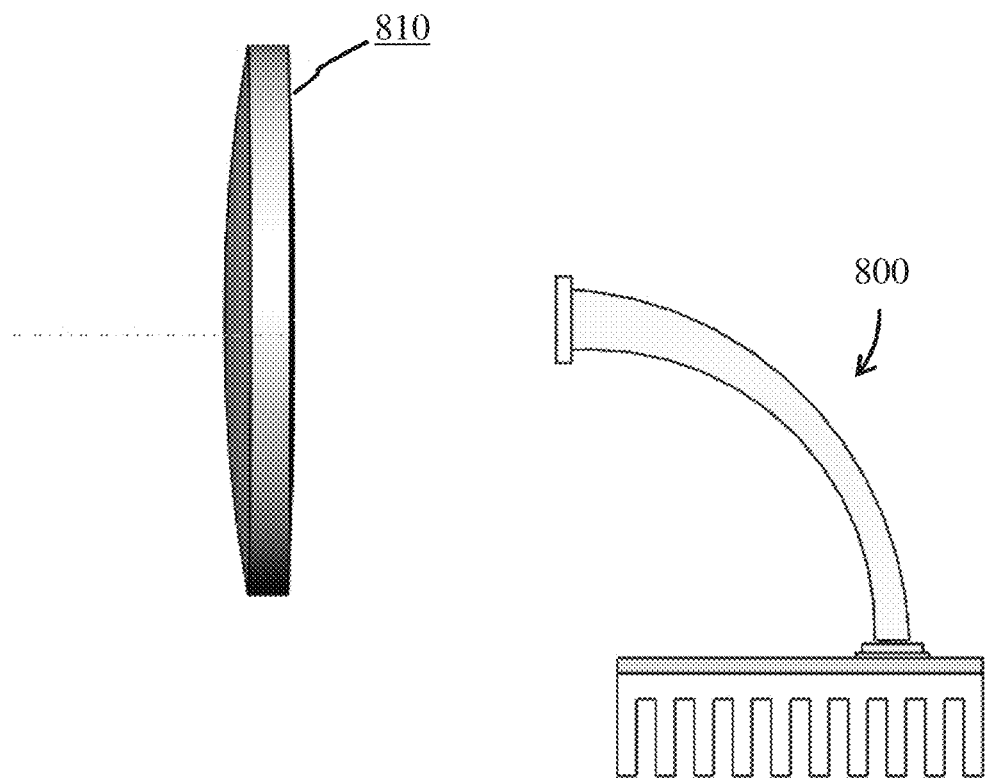
Figure 8G:
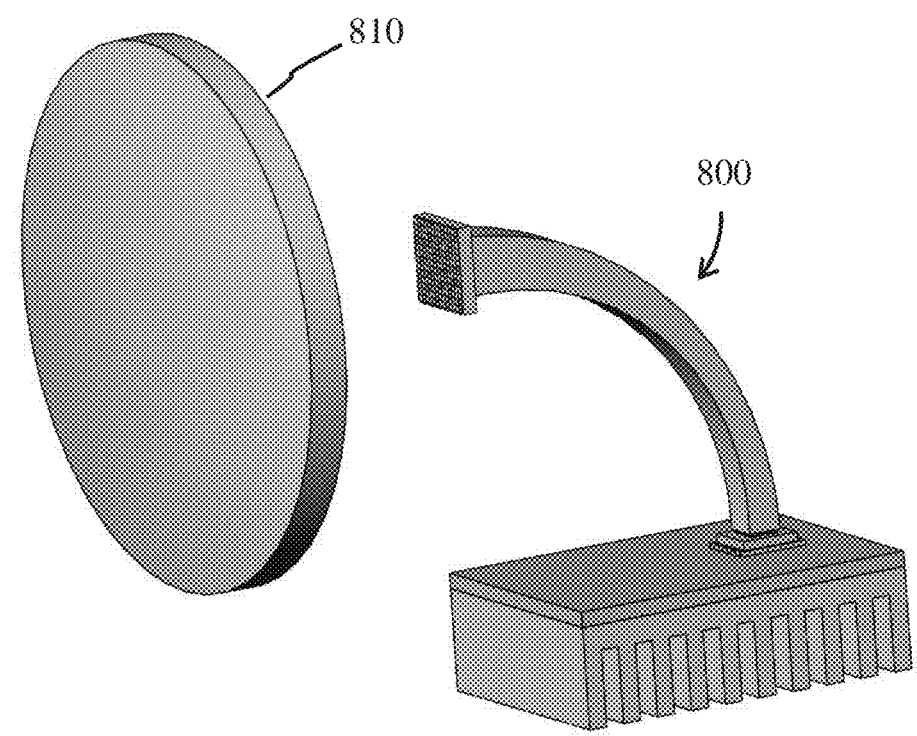

FIGS. 8F and 8G schematically depict that in some embodiments, a projection lens 810 can be optically coupled to the output surface 802b of the light pipe to project the light exiting the output surface onto a target area. In some embodiments, the projection lens can function as a zoom lens. For example, in some embodiments, the projection lens can be in the form of a lens doublet, one of which has a positive optical power and the other a negative optical power, and can be movable relative to the output surface 802b so as to adjust the angular spread of a light beam exiting the output surface 802b, e.g., between a narrow-beam and wide-beam angular spreads.

Figure 9A:
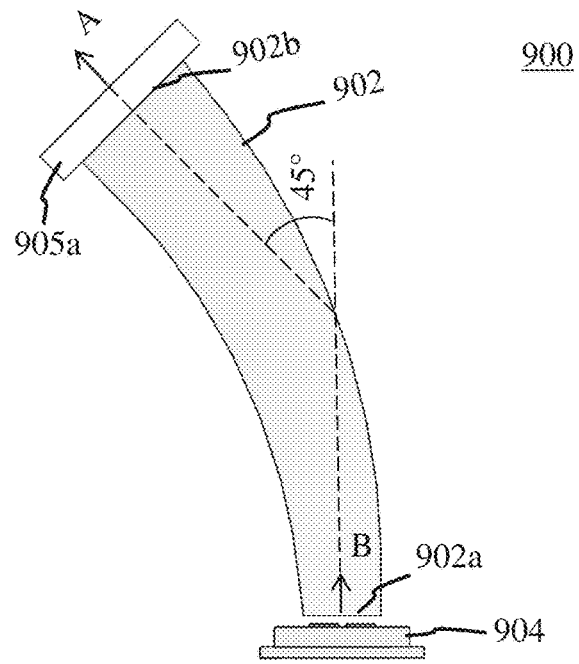
FIG. 9A is a schematic cross-sectional view of a light system according to an embodiment in which the input and output surfaces of a light pipe of the light system are oriented at a 45-degree angle relative to one another.
Figure 9B:
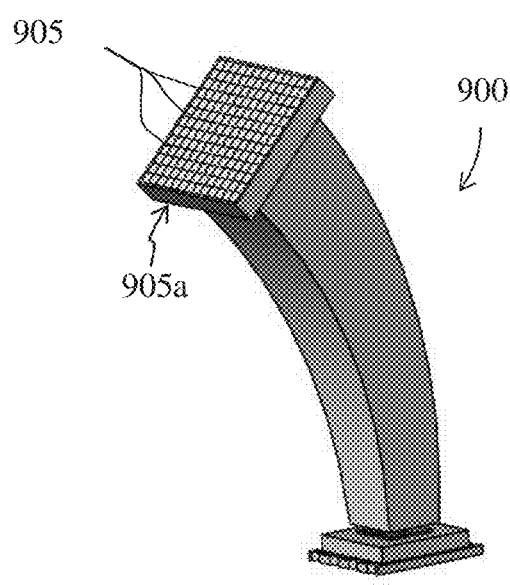
FIG. 9B is a schematic perspective view of the light system illustrated in FIG. 9A, depicting a plurality of microlenses optically coupled to the output surface of the light pipe of the light system.
Figure 9C:
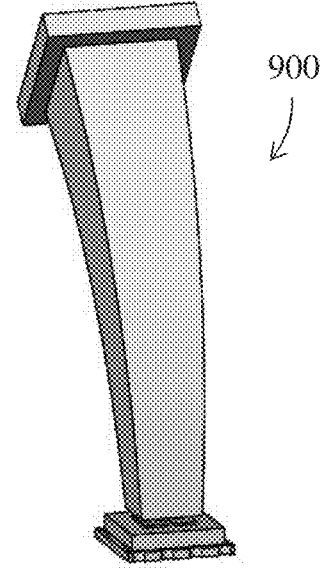
FIG. 9C is another schematic perspective view of the light system shown in FIG. 9A.

With reference to FIGS. 9A, 9B and 9C, in another embodiment, an optical system 900 includes a light pipe 902 that extends from an input surface 902a to an output surface 902b. In this embodiment, the light pipe is bent such that a putative vector A perpendicular to the output surface 902b forms a 45-degree angle with a putative vector A perpendicular to the input surface 902a. The light pipe 902 receives light from a light source 904 at its input surface 902a and directs the light via total internal reflection at its peripheral surfaces to the output surface 902b through which the light exits the light pipe. In some embodiments, the light source 904 can be an LED or a plurality of LEDs, e.g., LEDs providing light of different colors.

A plurality of microlenses 905 are optically coupled to the output surface 902b to redirect and/or shape the light exiting the light pipe. While in this embodiment, the microlenses 905 are formed in a separate unit 905a that is coupled to the output surface 902b, in other embodiments the microlenses can be incorporated in the output surface. Further, in some embodiments, the surfaces of the microlenses can be textured, e.g., in the form of a plurality of projections having a height in a range of about 0.01 mm to about 1 mm. In other embodiments, such surface texturing can be incorporated in the output surface 902b in absence of the microlenses.

Figure 9D:
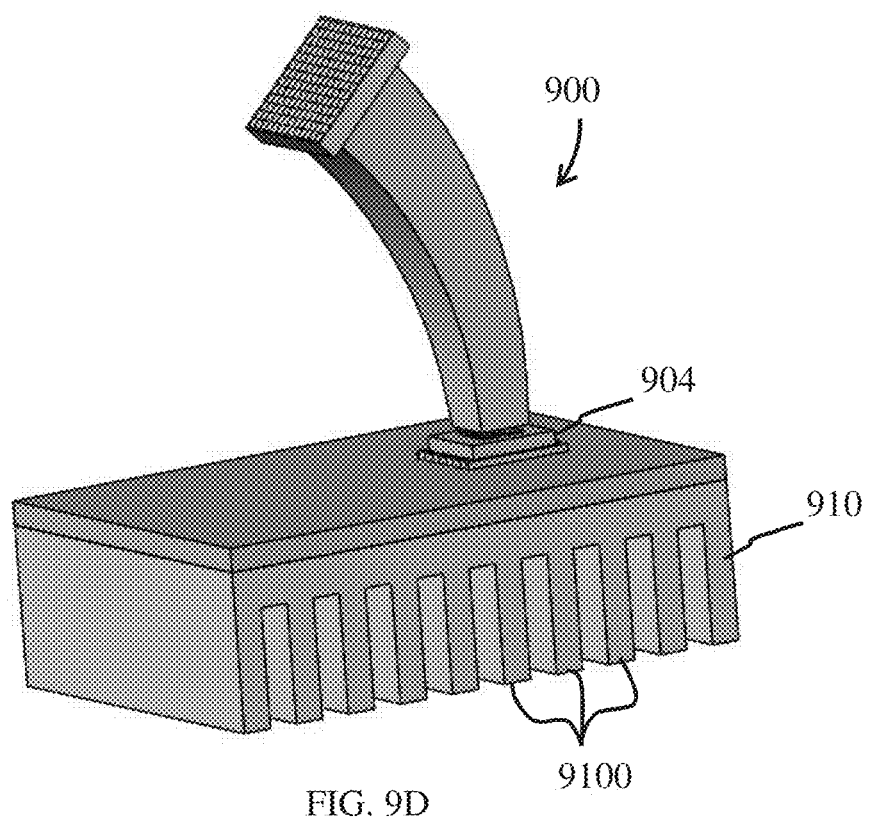
FIG. 9D is a schematic perspective view of an embodiment of the light system illustrated in FIG. 9A in which a heat sink is thermally coupled to a light source of the light system.
Figure 9E:
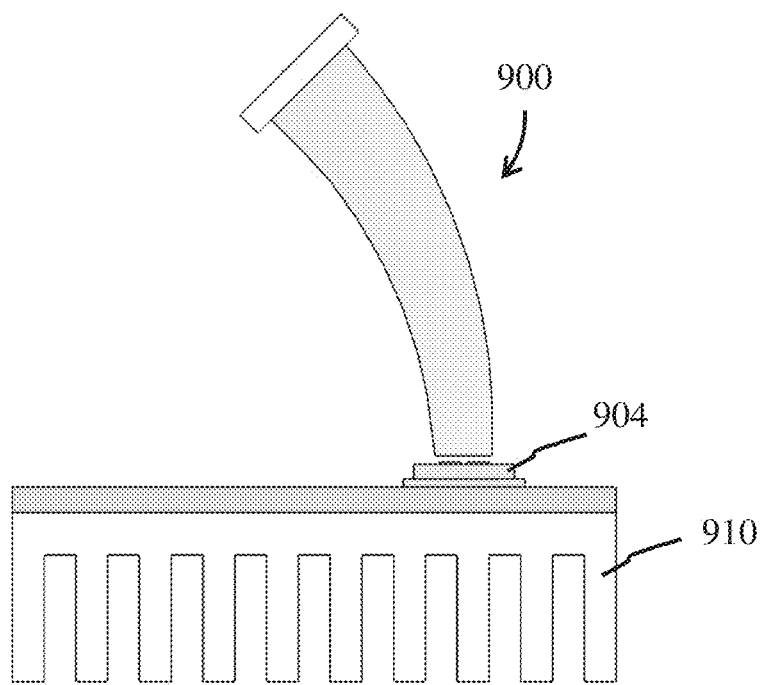
FIG. 9E is a schematic cross-sectional view of the light system shown in FIG. 9D.

With reference to FIGS. 9D and 9E, in some embodiments, a heat sink 910 can be thermally coupled to the light source 904 to remove heat generated by the light source. The heat sink 910 can include a plurality of fins 910a that facilitate heat removal from the light source by providing an increased surface area.

Figure 9F:
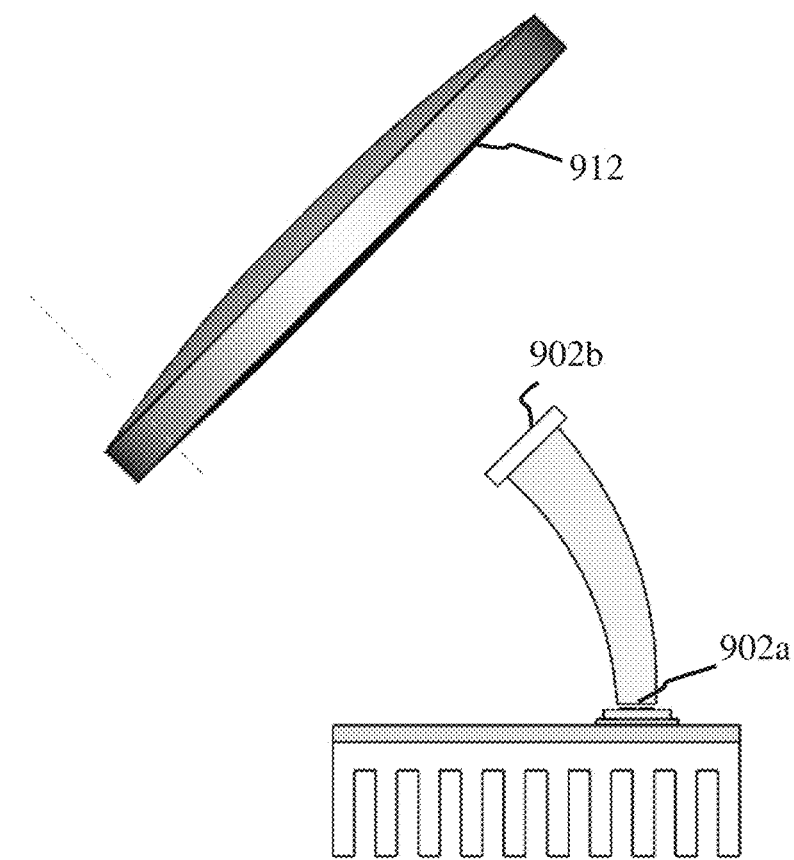
FIG. 9F is a schematic view of an embodiment of the light system of FIG. 9A in which a projection lens is optically coupled to the output surface of a light pipe of the light system.
Figure 9G:
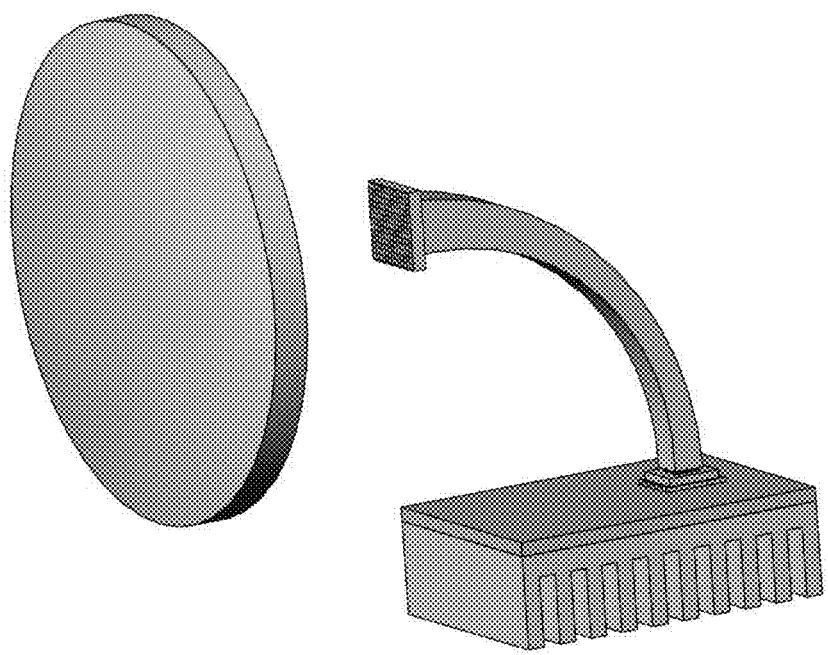
FIG. 9G is a schematic perspective view of the light system depicted in FIG. 9F, FIG. 10 schematically depicts a light pipe having a tapered cross section exhibiting a progressively increasing surface area from its input surface to its output surface, and FIG. 11 schematically depicts a light pipe for use in a light-mixing system according to the present teachings, which exhibits different cross-sectional shapes along its length.

With reference to FIGS. 9F and 9G, in some embodiments a projection lens 912 can be optically coupled to the output surface 902b to project the light received from the light pipe onto a target surface. In some embodiments, the projection lens can be a zoom lens.

While in the above two embodiments, the input and output surfaces of the light pipe are oriented relative to one another by 90 and 45 degrees, more generally, the input and output surfaces of the light pipe of a light-mixing system according to the present teachings can form an angle from 0 and 90 degrees, e.g., in a range of about 30 to 90 degrees, relative to one another. In other words, putative vectors normal to the input and output surfaces of the light pipe can make an angle in a range of 0 and 90 degrees, e.g., in a range of about 30 to 90 degrees, relative to one another.

In some implementations of any of the above embodiments, the input and the output surfaces of the light pipe of a light-mixing system according to the present teachings can have different surface areas. By way of example, as shown schematically in FIG. 8A, the output surface 802b of the light pipe 802 has a surface area greater than the surface area of the input surface 802a. By way of example, in some embodiments, the output surface can have a surface area that is at least about 10%, or at least about 20%, or at least about 30%, or at least about 40%, or at least about 50%, greater than the surface area of the input surface of the light pipe.

Figure 10:
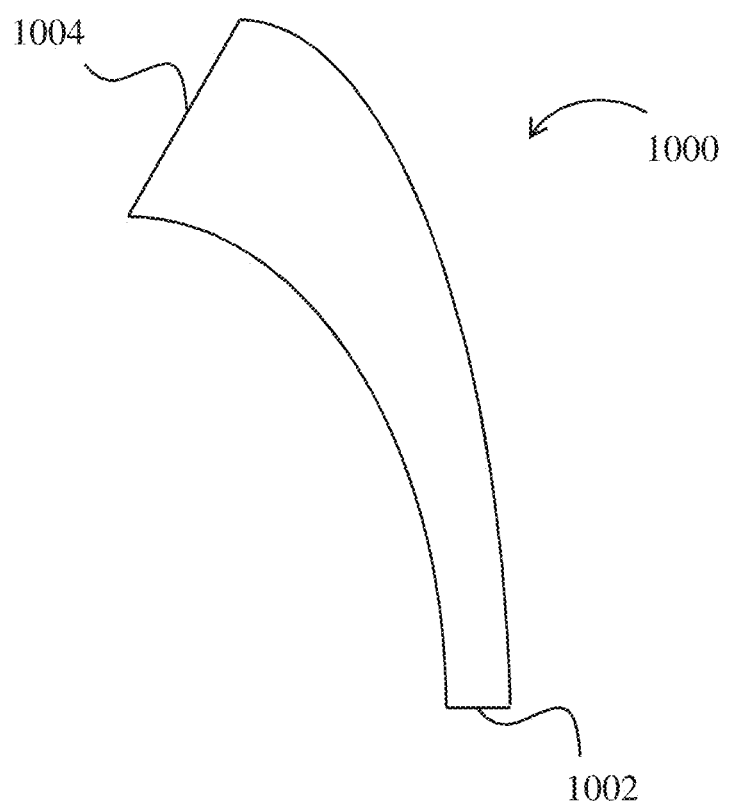

Further, in some implementations of any of the above embodiments, the light pipe of a light-mixing system according to the present teachings can have a tapered cross-sectional profile extending from the input surface to the output surface. By way of example, with reference to FIG. 10, a light pipe 1000 exhibits a cross-sectional area that continuously increases from an input surface 1002 to an output surface 1004. In other embodiments, the cross-sectional area of a light pipe of a light-mixing system according to the present teachings can be uniform along the length of the light pipe.

Figure 11:
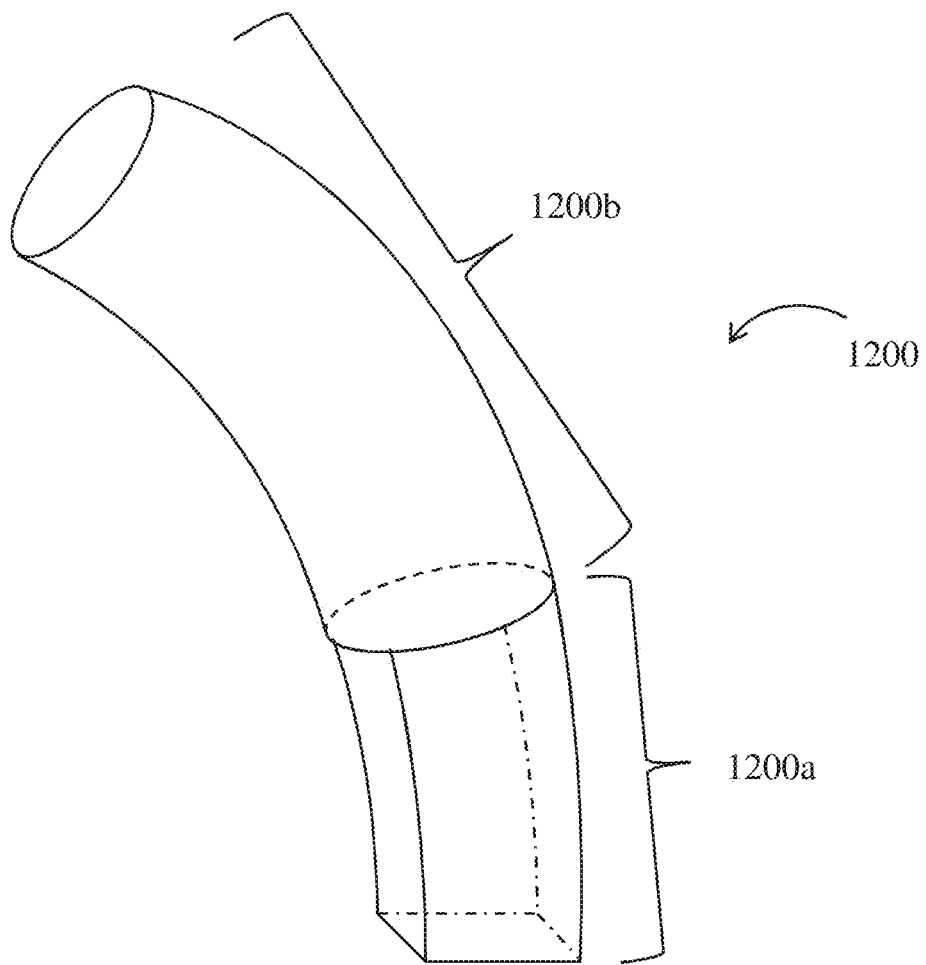

In some implementations of any of the above embodiments, different portions of a light pipe of a light-mixing system according to the present teachings can have different cross-sectional shapes. For example, a portion of the light pipe can have one polygonal shape, e.g., square, and another portion of the light pipe can have a different polygonal shape, e.g., hexagonal. Alternatively, a portion of the light pipe, e.g., a proximal portion, can have a polygonal cross section and another portion of the light pipe, e.g., a distal portion, can have a round cross section. By way of example, FIG. 11 schematically depicts a light pipe 1200 having a proximal section 1200a with a square cross section and a distal section 1200b having a round cross section. In other embodiments, the light pipe can exhibit more than two cross-sectional shapes along its length.

In the above embodiments, various components of a light-mixing system according to the present teachings, such as the light pipe, the projection lens, can be formed of any suitable material. Some examples of suitable materials include, without limitation, polymers, such as PMMA (polymethylmethacrylate) or similar polymer, silicone, glass, among others.

The curved light pipes in the above embodiments can advantageously increase the path length of the light propagating through them, thereby enhancing light mixing, while ensuring that the height of the system can be less than that of a conventional system providing a similar degree of light mixing.

Those having ordinary skill in the art will appreciate that various changes can be made to the above embodiments without departing from the scope of the invention.

What is claimed is:

1. A light-mixing system, comprising:
a light pipe comprising:
an input surface configured for receiving light from a light source,
a light-mixing segment optically coupled to said input surface,
an output surface optically coupled to said light-mixing segment through which light exits the light pipe,
wherein a vector normal to at least one of said input and output surface forms a non-zero angle relative to a longitudinal axis of said light-mixing segment, and
wherein said input surface is oriented at about 45 degrees relative to said output surface.

2. The light-mixing system of claim 1, wherein said non-zero angle is about 90 degrees.

3. The light-mixing system of claim 1, further comprising a reflective surface optically coupled to said input surface and said light-mixing segment for directing at least a portion of the light received via the input surface to said light-mixing segment.

4. The light-mixing system of claim 3, wherein said reflective surface is metalized.

5. The light-mixing system of claim 3, wherein said reflective surface is configured to reflect light incident thereon via total internal reflection.

6. The light-mixing system of claim 1, wherein said light-mixing segment comprises a surface configured to reflect light incident thereon via total internal reflection.

7. The light-mixing system of claim 1, wherein said light-mixing segment is polygonal.

8. The light-mixing system of claim 1, wherein said light source comprises an LED.

9. The light-mixing system of claim 1, wherein said light source comprises a plurality of LEDs generating light of different colors.

10. The light-mixing system of claim 1, wherein said output surface comprises a plurality of microlenses.

11. The light-mixing system of claim 1, wherein said output surface comprises a textured surface.

12. The light-mixing system of claim 1, wherein said output surface comprises a plurality of microlenses and surface texturing.

13. The light-mixing system of claim 1, wherein a ratio of a vertical separation (D) between said input and output surfaces relative to a lateral separation (L) therebetween is in a range of about 0 to about 1.

14. The light-mixing system of claim 1, further comprising a heat sink that is thermally coupled to the light source.

15. The light-mixing system of claim 1, wherein the output surface of the light pipe has a surface area greater than a surface area of the input surface thereof.

16. The light-mixing system of claim 1, wherein said light pipe has a tapered cross section extending from said input surface to said output surface.

17. The light-mixing system of claim 1, wherein said light pipe includes sections having different cross-sectional profiles.

18. A light-mixing system, comprising:
a light pipe comprising:
an input surface configured for receiving light from a light source,
a light-mixing segment optically coupled to said input surface,
an output surface optically coupled to said light-mixing segment through which light exits the light pipe,
wherein a vector normal to at least one of said input and output surface forms a non-zero angle relative to a longitudinal axis of said light-mixing segment,
wherein said light pipe has sections having different polygonal shapes.

19. The light-mixing system of claim 18, wherein said non-zero angle is about 90 degrees.

20. The light-mixing system of claim 18, further comprising a reflective surface optically coupled to said input surface and said light-mixing segment for directing at least a portion of the light received via the input surface to said light-mixing segment.

21. The light-mixing system of claim 20, wherein said reflective surface is metalized.

22. The light-mixing system of claim 20, wherein said reflective surface is configured to reflect light incident thereon via total internal reflection.

23. The light-mixing system of claim 18, wherein said light-mixing segment comprises a surface configured to reflect light incident thereon via total internal reflection.

24. The light-mixing system of claim 18, wherein said light-mixing segment is polygonal.

25. The light-mixing system of claim 18, wherein said light source comprises an LED.

26. The light-mixing system of claim 18, wherein said light source comprises a plurality of LEDs generating light of different colors.

27. The light-mixing system of claim 18, wherein said output surface comprises a plurality of microlenses.

28. The light-mixing system of claim 18, wherein said output surface comprises a textured surface.

29. The light-mixing system of claim 18, wherein said output surface comprises a plurality of microlenses and surface texturing.

30. The light-mixing system of claim 18, wherein a ratio of a vertical separation (D) between said input and output surfaces relative to a lateral separation (L) therebetween is in a range of about 0 to about 1.

31. The light-mixing system of claim 18, further comprising a heat sink that is thermally coupled to the light source.

32. The light-mixing system of claim 18, wherein the output surface of the light pipe has a surface area greater than a surface area of the input surface thereof.

33. The light-mixing system of claim 18, wherein said light pipe has a tapered cross section extending from said input surface to said output surface.

34. The light-mixing system of claim 18, wherein said light pipe includes sections having different cross-sectional profiles.

35. The light-mixing system of claim 18, further comprising a projection lens optically coupled to said output surface.

36. A light-mixing system, comprising:
a light pipe comprising:
an input surface configured for receiving light from a light source,
a light-mixing segment optically coupled to said input surface,
an output surface optically coupled to said light-mixing segment through which light exits the light pipe,
wherein a vector normal to at least one of said input and output surface forms a non-zero angle relative to a longitudinal axis of said light-mixing segment,
wherein at least one of said sections has a polygonal shape and another one of said sections has a round shape.

37. The light-mixing system of claim 36, wherein said non-zero angle is about 90 degrees.

38. The light-mixing system of claim 36, further comprising a reflective surface optically coupled to said input surface and said light-mixing segment for directing at least a portion of the light received via the input surface to said light-mixing segment.

39. The light-mixing system of claim 38, wherein said reflective surface is metalized.

40. The light-mixing system of claim 38, wherein said reflective surface is configured to reflect light incident thereon via total internal reflection.

41. The light-mixing system of claim 36, wherein said light-mixing segment comprises a surface configured to reflect light incident thereon via total internal reflection.

42. The light-mixing system of claim 36, wherein said light-mixing segment is polygonal.

43. The light-mixing system of claim 36, wherein said light source comprises an LED.

44. The light-mixing system of claim 36, wherein said light source comprises a plurality of LEDs generating light of different colors.

45. The light-mixing system of claim 36, wherein said output surface comprises a plurality of microlenses.

46. The light-mixing system of claim 36, wherein said output surface comprises a textured surface.

47. The light-mixing system of claim 36, wherein said output surface comprises a plurality of microlenses and surface texturing.

48. The light-mixing system of claim 36, wherein a ratio of a vertical separation (D) between said input and output surfaces relative to a lateral separation (L) therebetween is in a range of about 0 to about 1.

49. The light-mixing system of claim 36, further comprising a heat sink that is thermally coupled to the light source.

50. The light-mixing system of claim 36, wherein the output surface of the light pipe has a surface area greater than a surface area of the input surface thereof.

51. The light-mixing system of claim 36, wherein said light pipe has a tapered cross section extending from said input surface to said output surface.

52. The light-mixing system of claim 36, wherein said light pipe includes sections having different cross-sectional profiles.

53. The light-mixing system of claim 36, further comprising a projection lens optically coupled to said output surface.

54. A light pipe, comprising:
a curved light-guiding waveguide extending from a proximal end to a distal end, said curved light-guiding waveguide comprising an input surface at said proximal end configured to receive light from a light source and an output surface at said distal end,
wherein said curved light-guiding waveguide has a serpentine shape.

55. The light pipe of claim 54, wherein a vector normal to said input surface is substantially parallel to a respective vector normal to said output surface.

56. The light pipe of claim 54, wherein said output surface comprises a plurality of microlenses for diffusing light passing therethrough.

57. The light pipe of claim 54, wherein said output surface comprises surface texturing.

58. The light pipe of claim 54, wherein said output surface comprises a plurality of microlenses and surface texturing.

59. The light pipe of claim 54, wherein said input surface and said output surface of the light-guiding waveguide are substantially at the same vertical level.

60. The light pipe of claim 54, wherein said output surface of the light-guiding waveguide is positioned vertically higher than said input surface.

61. The light pipe of claim 54, further comprising a projection lens optically coupled to said output surface.

62. The light pipe of claim 54, wherein said light source is positioned relative to said input surface of the light pipe such that the light entering said input surface has a direction opposite to direction of light exiting said output surface.

63. A light pipe, comprising:
a curved light-guiding waveguide extending from a proximal end to a distal end, said curved light-guiding waveguide comprising an input surface at said proximal end configured to receive light from a light source and an output surface at said distal end,
wherein said curved light-guiding waveguide has a hemispherical shape.

64. The light pipe of claim 63, wherein a vector normal to said input surface is substantially parallel to a respective vector normal to said output surface.

65. The light pipe of claim 63, wherein said output surface comprises a plurality of microlenses for diffusing light passing therethrough.

66. The light pipe of claim 63, wherein said output surface comprises surface texturing.

67. The light pipe of claim 63, wherein said output surface comprises a plurality of microlenses and surface texturing.

68. The light pipe of claim 63, wherein said input surface and said output surface of the light-guiding waveguide are substantially at the same vertical level.

69. The light pipe of claim 63, wherein said output surface of the light-guiding waveguide is positioned vertically higher than said input surface.

70. The light pipe of claim 63, further comprising a projection lens optically coupled to said output surface.

71. The light pipe of claim 63, wherein said light source is positioned relative to said input surface of the light pipe such that the light entering said input surface has a direction opposite to direction of light exiting said output surface.

* * * * *